US012658215B2

(12) United States Patent
    Zaima et al.

(10) Patent No.:  US 12,658,215 B2
(45) Date of Patent:      Jun. 16, 2026

(54) MAGNETIC DISK DEVICE INCLUDING A DESICCANT ASSEMBLY AND METHOD OF MANUFACTURING THE SAME

(71) Applicants: Kabushiki Kaisha Toshiba, Tokyo (JP); Toshiba Electronic Devices & Storage Corporation, Tokyo (JP)

(72) Inventors: Shino Zaima, Kamakura Kanagawa (JP); Tomoyuki Tokizaki, Yokohama Kanagawa (JP); Akiyo Mizutani, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/781,728

(22) Filed: Jul. 23, 2024

(65) Prior Publication Data

US 2025/0273248 A1      Aug. 28, 2025

(30) Foreign Application Priority Data

Feb. 22, 2024    (JP) ................................. 2024-025102

(51) Int. Cl.
    G11B 33/14          (2006.01)
(52) U.S. Cl.
    CPC ........  G11B 33/148 (2013.01); G11B 33/1453 (2013.01)
(58) Field of Classification Search
    None
    See application file for complete search history.

(56) References Cited

U.S. PATENT DOCUMENTS

| | | | |
|---|---|---|---|
| 5,551,557 A | | 9/1996 | Brooks et al. |
| 5,590,001 A | * | 12/1996 | Ino ....................... G11B 25/043 |
| | | | 360/97.18 |
| 5,764,435 A | * | 6/1998 | Sugimoto .......... G11B 33/1486 |
| | | | 360/97.18 |
| 7,988,770 B2 | | 8/2011 | Hashida et al. |

(Continued)

FOREIGN PATENT DOCUMENTS

| | | |
|---|---|---|
| JP | 2008-55365 A | 3/2008 |
| JP | 2022-180054 A | 12/2022 |
| JP | 2025-47506 A | 4/2025 |

OTHER PUBLICATIONS

U.S. Appl. No. 18/428,988, filed Jan. 31, 2024.

*Primary Examiner* — William J Klimowicz
(74) *Attorney, Agent, or Firm* — Kim & Stewart LLP

(57)                  ABSTRACT

A magnetic disk device of an embodiment includes: a housing in which a base and a cover are combined and airtightly closed; a magnetic disk housed in the housing; a needle protruding upward in an internal space of the housing; and a desiccant assembly provided on the cover so as to face the base away from the base by a predetermined distance, in which the desiccant assembly includes: a case including an opening on a surface facing the base, a sealing film provided at the opening, a division filter that divides space of the case into a first chamber and a second chamber, the second chamber including the opening, and a desiccant filled in the first chamber, and the second chamber communicates with the internal space of the housing by the needle penetrating the sealing film.

17 Claims, 13 Drawing Sheets

(56)                    References Cited

U.S. PATENT DOCUMENTS

|              |       |         |                 |                |
| ------------ | ----- | ------- | --------------- | -------------- |
| 8,760,797    | B1 *  | 6/2014  | Beatty          | G11B 33/1453   |
|              |       |         |                 | 360/97.12      |
| 8,885,290    | B1 *  | 11/2014 | Gustafson       | G11B 25/043    |
|              |       |         |                 | 360/97.16      |
| 8,908,319    | B1 *  | 12/2014 | Gustafson       | G11B 33/1453   |
|              |       |         |                 | 360/97.16      |
| 9,001,458    | B1 *  | 4/2015  | Vitikkate       | G11B 33/148    |
|              |       |         |                 | 360/97.22      |
| 9,418,710    | B1 *  | 8/2016  | Choe, Jr.       | B01D 53/323    |
| 10,424,336   | B1 *  | 9/2019  | Kraus           | G11B 33/146    |
| 10,971,195   | B2 *  | 4/2021  | Kraus           | B01D 53/261    |
| 11,024,343   | B2    | 6/2021  | Luebben et al.  |                |
| 11,942,119   | B2 *  | 3/2024  | Mizutani        | G11B 33/1466   |
| 12,272,379   | B2 *  | 4/2025  | Tokizaki        | G11B 33/1466   |
| 2004/0013866 | A1 *  | 1/2004  | Sasaki          | B01J 20/28033  |
|              |       |         |                 | 428/318.4      |
| 2006/0032371 | A1 *  | 2/2006  | Dauber          | G11B 33/12     |
|              |       |         |                 | 95/90          |
| 2016/0310625 | A1    | 10/2016 | Hudson et al.   |                |
| 2019/0066716 | A1 *  | 2/2019  | Suzuki          | G11B 5/10      |
| 2022/0375502 | A1 *  | 11/2022 | Mizutani        | G11B 33/1466   |
| 2024/0096372 | A1 *  | 3/2024  | Tokizaki        | G11B 33/1466   |
| 2025/0104741 | A1    | 3/2025  | Zaima et al.    |                |

* cited by examiner

FIG.7A
FIG.7B
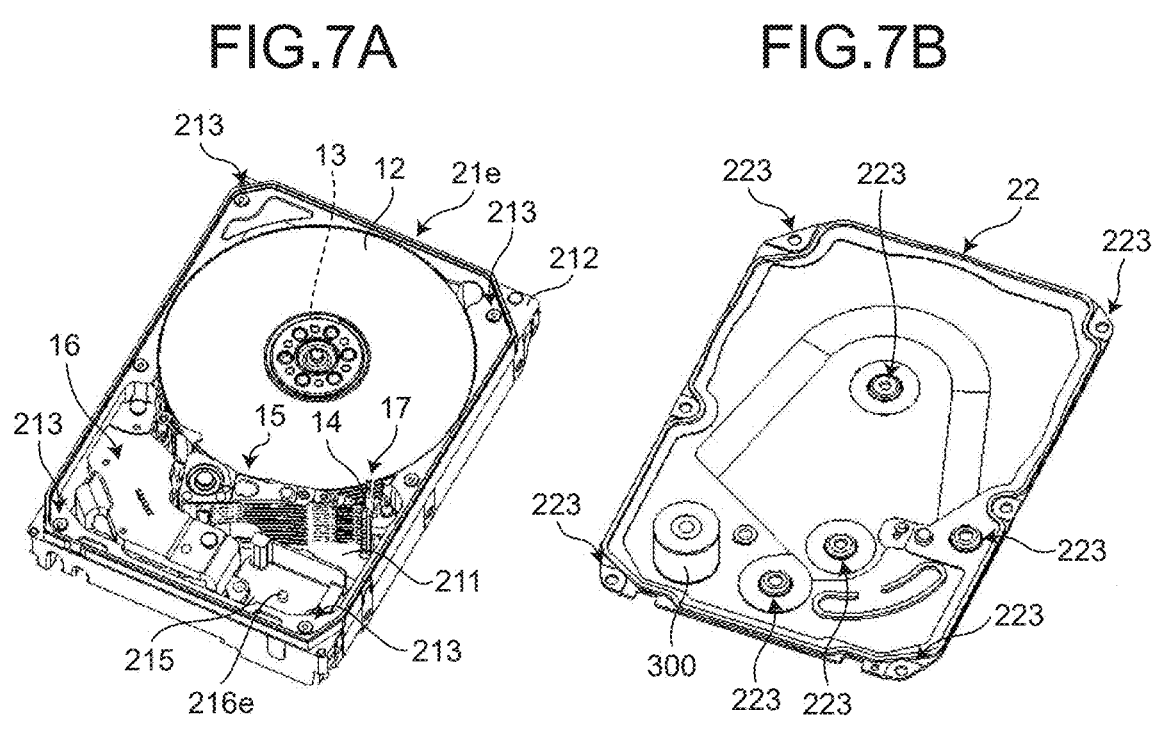
FIG.7C
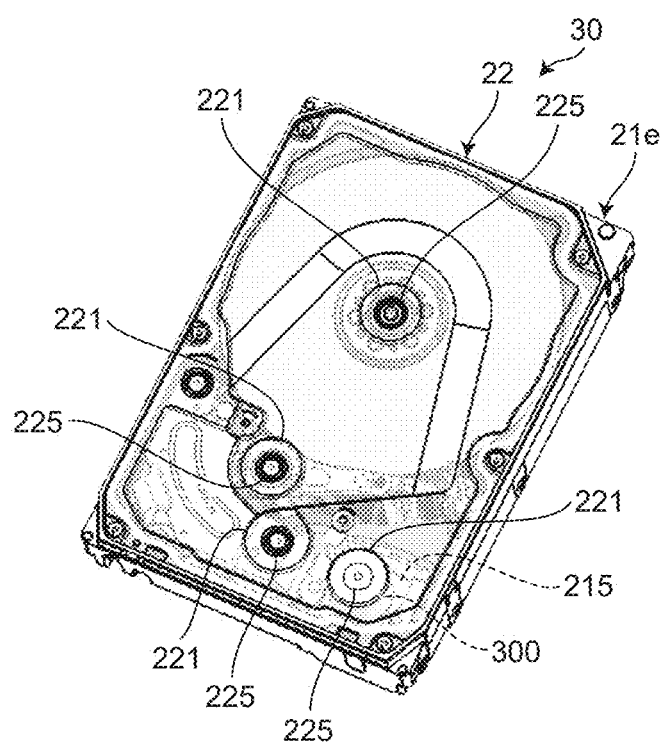

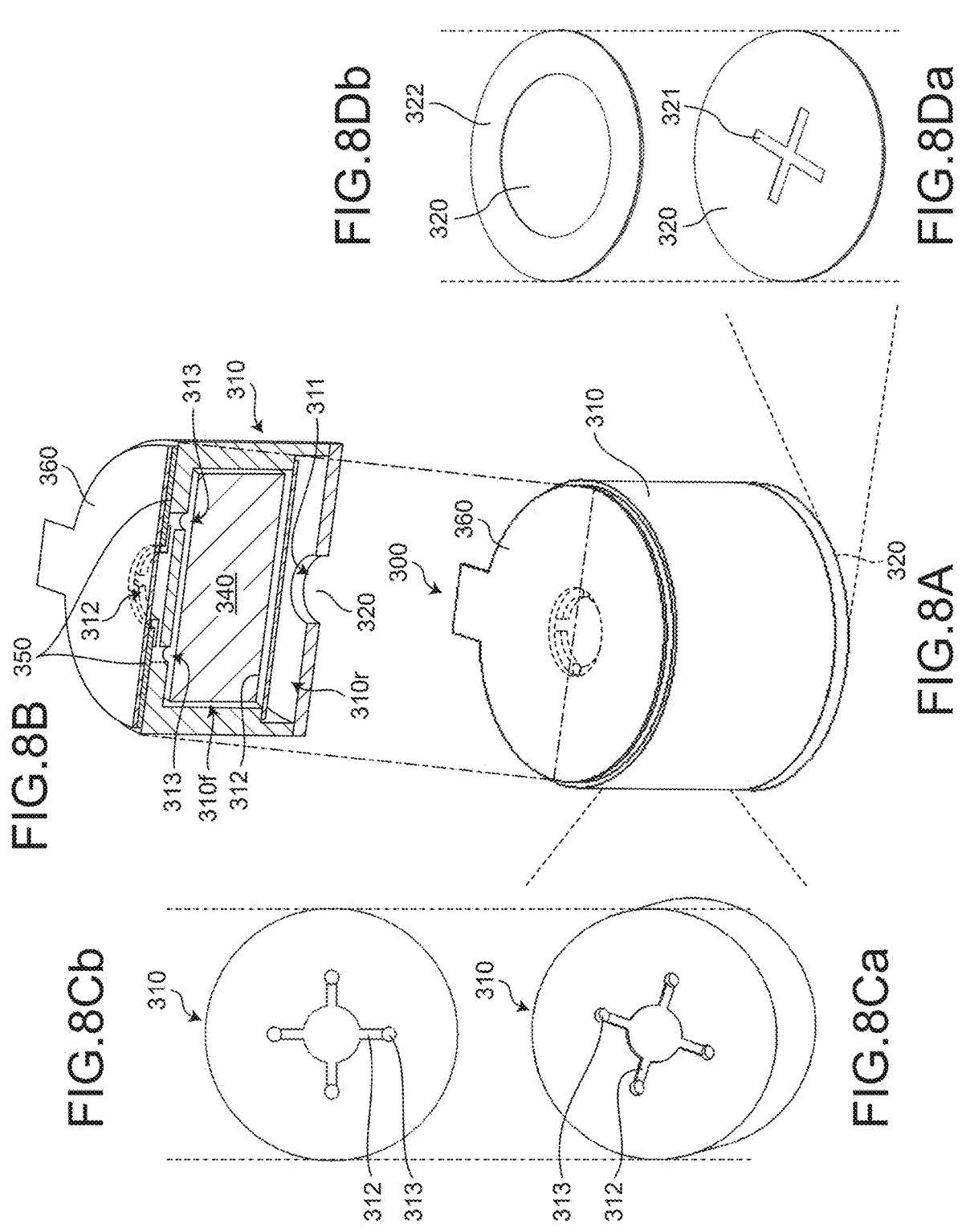

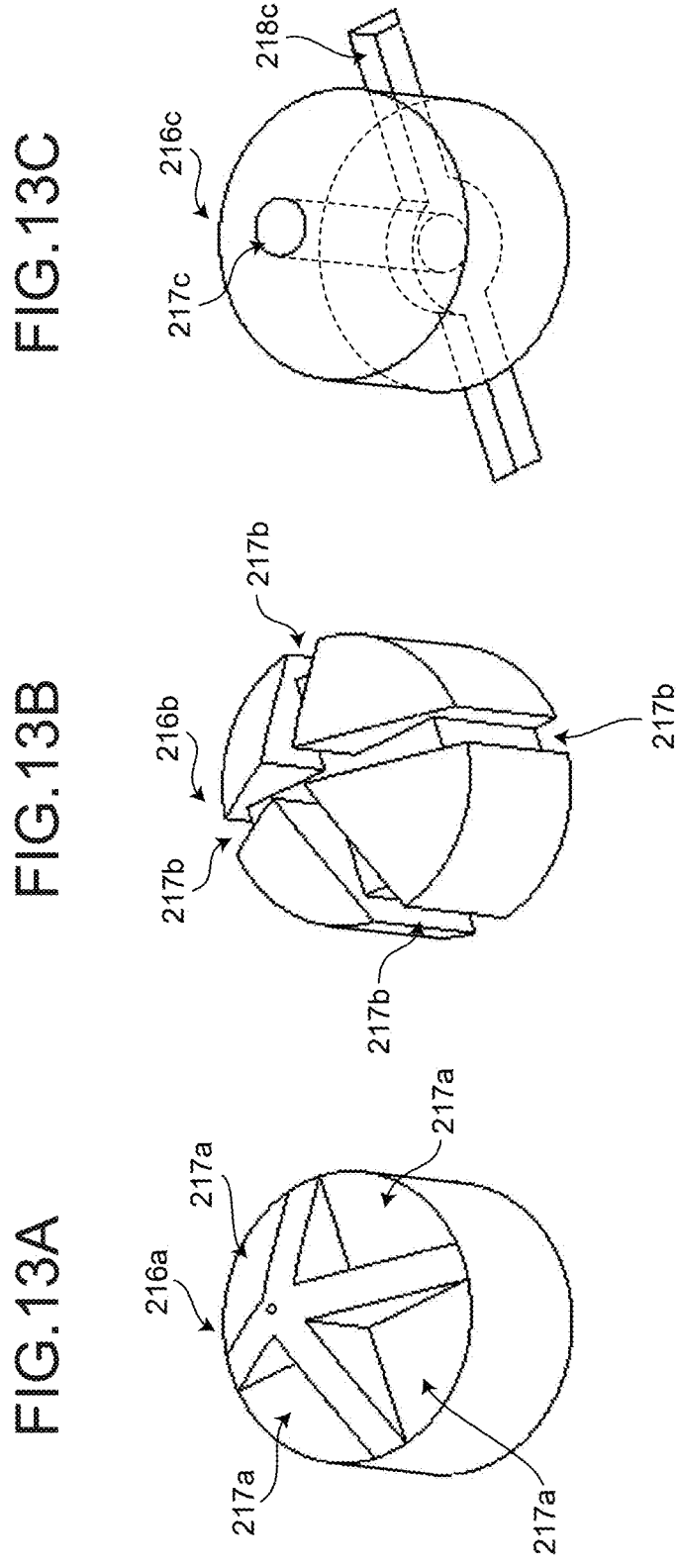

MAGNETIC DISK DEVICE INCLUDING A DESICCANT ASSEMBLY AND METHOD OF MANUFACTURING THE SAME

CROSS-REFERENCE TO RELATED APPLICATIONS

This application is based upon and claims the benefit of priority from Japanese Patent Application No. 2024-025102, filed on Feb. 22, 2024; the entire contents of which are incorporated herein by reference.

FIELD

Embodiments described herein relate generally to a magnetic disk device and a method of manufacturing the magnetic disk device.

BACKGROUND

A magnetic disk device includes a housing that houses various components including a magnetic disk. The housing includes, for example, a base and a cover attached to the base. In order to reduce rotation resistance of the magnetic disk, the inside of the housing is filled with He gas or the like.

In such a magnetic disk device, desiccant may be enclosed for humidity control in a housing. In order to maintain hygroscopicity of the desiccant, exposure of the desiccant to an atmosphere is preferably inhibited to a very short time when the desiccant is enclosed in the housing.

BRIEF DESCRIPTION OF THE DRAWINGS

FIGS. 7A to 7C are exemplary perspective views illustrating a magnetic disk device according to a second embodiment in an exploded manner;

FIGS. 8A to 8Db are schematic views illustrating one example of a configuration of a desiccant assembly according to the second embodiment;

FIGS. 10A and 10B are schematic views illustrating one example of the procedure of the method of manufacturing the magnetic disk device according to the second embodiment;

FIGS. 13A to 13C are a schematic views illustrating some examples of needles of the magnetic disk device according to Variation 3 of the second embodiment.

DETAILED DESCRIPTION

A magnetic disk device of an embodiment includes: a housing in which a base and a cover are combined and airtightly closed; a magnetic disk housed in the housing; a needle protruding upward in an internal space of the housing; and a desiccant assembly provided on the cover so as to face the base away from the base by a predetermined distance, in which the desiccant assembly includes: a case including an opening on a surface facing the base, a sealing film provided at the opening, a division filter that divides space of the case into a first chamber and a second chamber, the second chamber including the opening, and desiccant filled in the first chamber, and the second chamber communicates with the internal space of the housing by the needle penetrating the sealing film.

Embodiments of the present invention will be described in detail below with reference to the drawings. Note that the present invention is not limited by the following embodiments. Furthermore, components in the following embodiments include those that can be easily assumed by those skilled in the art or those that are substantially the same.

First Embodiment

A first embodiment will be described in detail below with reference to the drawings.

(Configuration Example of Magnetic Disk Device)

Figure 1:
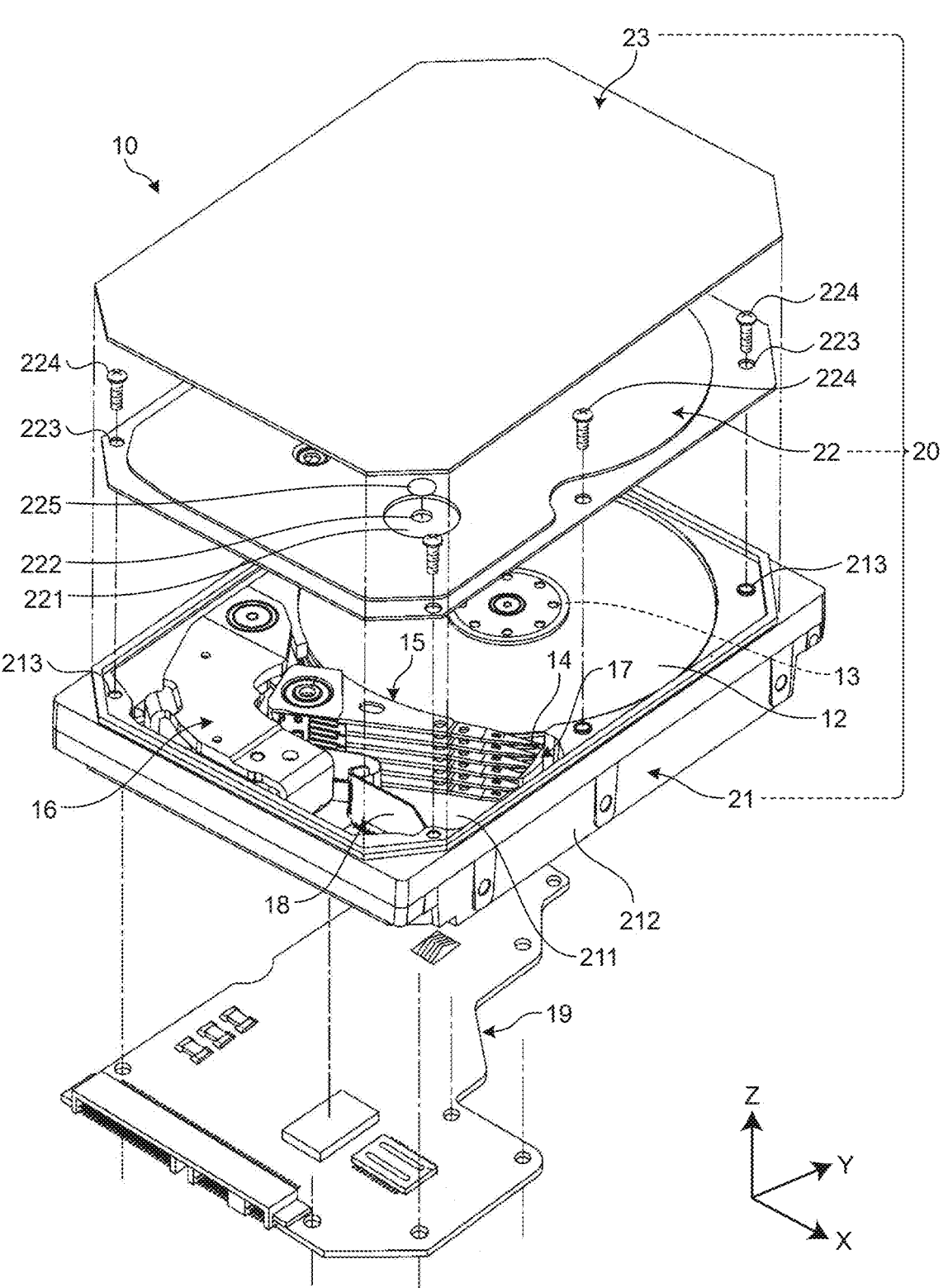
FIG. 1 is an exemplary perspective view illustrating a magnetic disk device according to a first embodiment in an exploded manner.

FIG. 1 is an exemplary perspective view illustrating a magnetic disk device 10 according to the first embodiment in an exploded manner. The magnetic disk device 10 of the first embodiment is configured as, for example, a hard disk drive (HDD). Note, however, that the magnetic disk device 10 of the first embodiment may be another magnetic disk device such as a hybrid HDD.

Note that, in the present specification, an X direction, a Y direction, and a Z direction are defined for convenience. The X direction, the Y direction, and the Z direction are orthogonal to each other. The X direction is defined as a direction along the width of the magnetic disk device 10. The Y direction is defined as a direction along the depth of the magnetic disk device 10. The Z direction is defined as a direction along the thickness of the magnetic disk device 10, and may also be referred to as a vertical direction in the present specification.

As illustrated in FIG. 1, the magnetic disk device 10 includes a plurality of magnetic disks 12, a spindle motor 13, a plurality of magnetic heads 14, a head stack assembly (HSA) 15, a voice coil motor (VCM) 16, a ramp load mechanism 17, a flexible printed circuit board (FPC) 18, a printed circuit board (PCB) 19, and a housing 20 that covers these members. The magnetic heads 14 are also referred to as sliders.

The housing 20 includes a base 21, an inner cover 22, and an outer cover 23. The base 21, the inner cover 22, and the outer cover 23 are made of metal such as aluminum alloy and stainless steel. Note, however, that the base 21, the inner cover 22, and the outer cover 23 may be made of other materials.

The base 21 is a bottomed container, and has a bottom wall 211 and a side wall 212. The bottom wall 211 has a shape of a substantially rectangular plate expanding along an XY plane. The side wall 212 protrudes from an edge of the bottom wall 211 in a direction along the Z direction. A plurality of screw holes 213 is provided in the upper surface of the side wall 212.

The inner cover 22 has a shape of a substantially rectangular plate expanding along the XY plane. The inner cover 22 includes a plurality of insertion holes 223 at positions corresponding to the screw holes 213 of the side wall 212 of the base 21.

Furthermore, the inner cover 22 includes a plurality of recesses 221 slightly recessed from the upper surface of the inner cover 22. These recesses 221 are provided in the inner cover 22 inside a portion vertically overlapping the side wall 212 of the base 21. A vent 222 or the insertion holes 223 penetrating the inner cover 22 in a plate thickness direction are provided at central portions of these recesses 221. A screw hole (not illustrated) is provided in a part of a member housed in the base 21. The insertion holes 223 provided at the centers of the recesses 221 are disposed at positions corresponding to screw holes provided in parts of these members. Seals 225 are attached to the vent 222 and the insertion holes 223 through which screws are tightened to close the vent 222 and the insertion holes 223.

Note that FIG. 1 illustrates only the vent 222 among the vent 222 and the insertion holes 223 provided at the centers of these recesses 221.

A plurality of screws 224 is inserted into the plurality of insertion holes 223 of the inner cover 22, and fixed to the plurality of screw holes 213 of the base 21. The inner cover 22 is thus attached to an end of the side wall 212 of the base 21 so as to overlap the base 21 in the Z direction, and fixed to the members housed in the base 21. A gasket (not illustrated) is interposed between the inner cover 22 and the base 21.

The outer cover 23 is airtightly joined to the end of the side wall 212 of the base 21 by, for example, welding so as to cover the inner cover 22.

Such a configuration causes the inside of the housing 20 to be sealed. The housing 20 houses the magnetic disks 12, the spindle motor 13, the magnetic heads 14, the HSA 15, the VCM 16, the ramp load mechanism 17, and the FPC 18 described above. Furthermore, the internal space of the housing 20 is filled with gas having a density lower than that of air, such as He gas, other mixed gases, or the like.

For example, the magnetic disks 12 are a disk-shaped recording media having recording surfaces on which magnetic recording layers are provided on upper surfaces, lower surfaces, and the like. The magnetic disks 12 in an example of FIG. 1 have a diameter of, for example, 3.5 inches. Note, however, that the magnetic disks 12 are not limited to the example.

The spindle motor 13 supports and rotates the plurality of magnetic disks 12 in an overlapping manner at predetermined intervals in the Z direction in which the recording surfaces thereof face each other. Here, the internal space of the housing 20 is filled with, for example, He gas as described above. This prevents the magnetic disks 12 from receiving air resistance when the magnetic disks 12 rotate at a high speed, so that rotation resistances of the magnetic disks 12 are reduced.

The magnetic disk device 10 of the first embodiment configured as described above is also referred to as a He-filled HDD, a He-sealed HDD, or the like. The magnetic disks 12 can be made thinner by filling the housing 20 with He gas or the like and lowering the rotation resistances of the magnetic disks 12. The capacity of the magnetic disk device 10 can be easily increased by increasing the number of stacked magnetic disks 12.

The plurality of magnetic disks 12 is held on a hub of the spindle motor 13 by, for example, a clamp spring. In the example of FIG. 1, the magnetic disk device 10 includes 10 magnetic disks 12 arranged in the Z direction. Note that the number of magnetic disks 12 is not limited to the example.

The magnetic heads 14 record and reproduce information on and from the recording surfaces of the magnetic disks 12. In other words, the magnetic heads 14 read and write information from and to the magnetic disks 12. The magnetic heads 14 are mounted on the HSA 15.

The HSA 15 is rotatably attached to the base 21 at a position separated from the magnetic disks 12 in a direction substantially orthogonal to the Z direction. The VCM 16 rotates the HSA 15 to dispose the magnetic heads 14 at desired positions. The ramp load mechanism 17 holds the magnetic heads 14 moved to the outermost peripheries of the magnetic disks 12 at unload positions separated from the magnetic disks 12.

The FPC 18 is supported and reinforced by an FPC plate provided on the bottom wall 211 of the base 21. One end of the FPC 18 is connected to a flexure included in the HSA 15. The FPC 18 is electrically connected to the magnetic heads 14 via the flexure of the HSA 15. The other end of the FPC 18 is connected to a connector provided on the bottom wall 211 of the base 21.

The PCB 19 is attached to the outside of the housing 20, such as the back surface of the bottom wall 211 of the base 21. The PCB 19 is mounted with various electronic components such as a relay connector, an interface (I/F) connector, and a controller. The relay connector is connected to the connector of the bottom wall 211 of the base 21. The I/F connector is connected to a host computer. The controller controls the operation of the magnetic disk device 10. The relay connector is electrically connected to the FPC 18 via the connector of the bottom wall 211 of the base 21.

Note that humidity control in the housing 20 is important for a He-filled HDD such as the magnetic disk device 10 of the first embodiment since gas other than He gas, moisture, and the like cause contamination in the housing 20. Therefore, a desiccant assembly filled with desiccant is enclosed in the housing 20 in the magnetic disk device 10 of the first embodiment.

(Configuration Example of Desiccant Assembly)

Next, a configuration example of a desiccant assembly 100 enclosed in the magnetic disk device 10 of the first embodiment will be described with reference to FIGS. 2A and 2B.

Figures 2A, 2B:
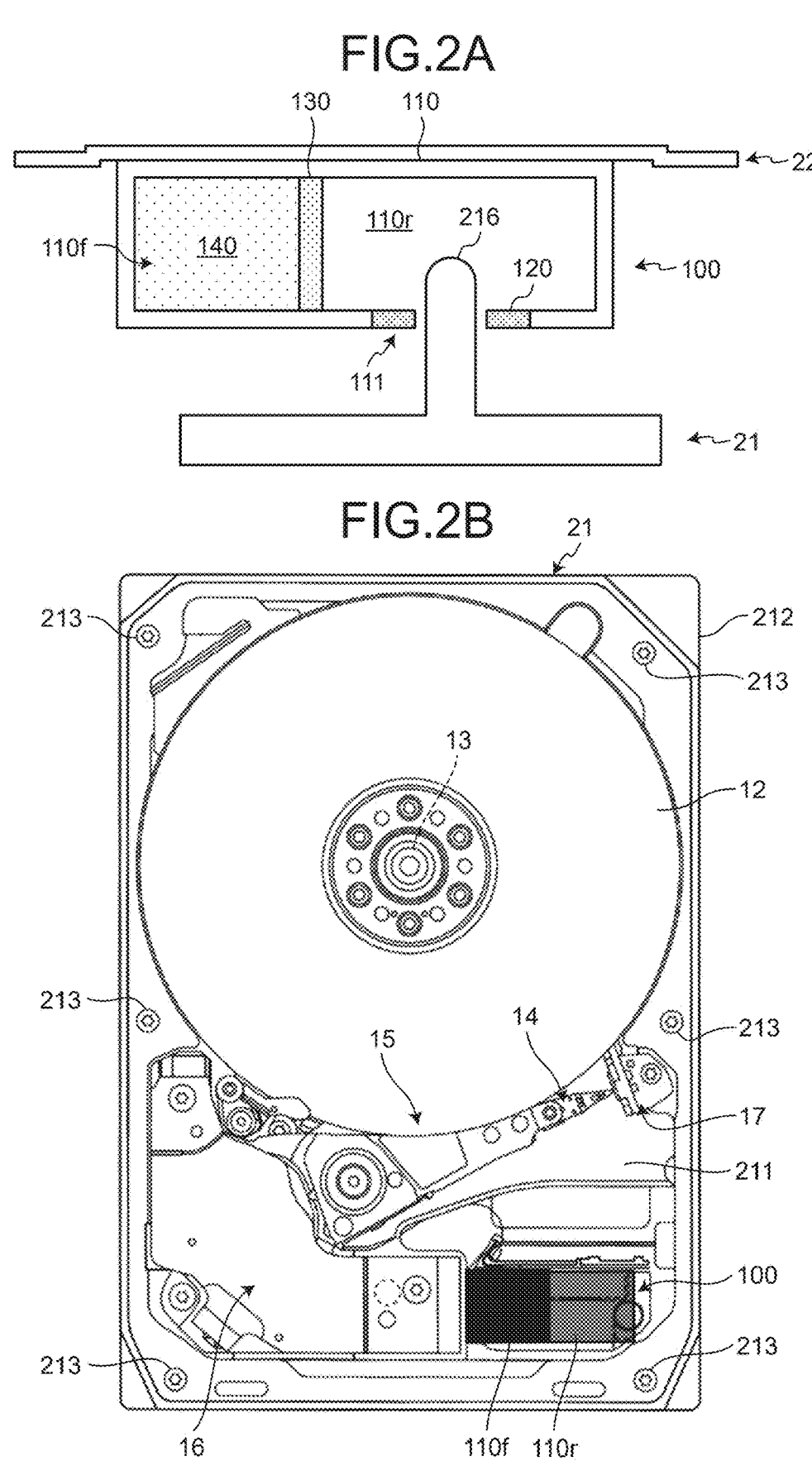
FIGS. 2A and 2B are schematic views illustrating one example of a configuration of a desiccant assembly according to the first embodiment.

FIGS. 2A and 2B are schematic views illustrating one example of a configuration of the desiccant assembly 100 according to the first embodiment. More specifically, FIG. 2A is a cross-sectional view of the desiccant assembly 100 enclosed in the magnetic disk device 10. FIG. 2B is a top view illustrating an internal structure of the magnetic disk device 10 in which the desiccant assembly 100 is enclosed.

As illustrated in FIGS. 2A and 2B, the desiccant assembly 100 of the first embodiment is provided on the inner surface of the inner cover 22 of the housing 20 so as to be housed in an empty space in the housing 20, such as a region surrounded by the HSA 15, the VCM 16, and the FPC 18.

The desiccant assembly 100 includes a case 110, a sealing film 120, a filter 130, and desiccant 140.

The case 110 is made of resin having a shape such as a rectangular parallelepiped having a space therein. Note, however, that the case 110 may be made of metal. In this case, the case 110 may be made of the same metal as the inner cover 22, such as aluminum alloy and stainless steel. The case 110 may be integrated with the inner cover 22.

The case 110 has an upper surface attached to the inner surface of the inner cover 22, and has an opening 111 on a side of a lower surface facing the base 21. The sealing film 120 is fitted into the opening 111. The sealing film 120 has sealability, and prevents transmission of air, gas such as He, moisture in the gas, and the like. The sealing film 120 is a thin film made of, for example, aluminum.

The filter 130 is provided in the case 110. The filter 130 divides the space in the case 110 in a direction along the inner surface of the inner cover 22. The filter 130 is, for example, a membrane filter made of poly-tetra-fluoro-eth-ylene (PTFE). Air, gas such as He, moisture in the gas, and the like can be transmitted through the filter 130. Note that the filter 130 is one example of a division filter that divides the space in the case 110 into two spaces 110r and 110f.

The space 110f among the two spaces 110r and 110f in the case 110 partitioned by the filter 130 is provided on a back side of the space 110r on a side having the opening 111 into which the sealing film 120 is fitted. The space 110f is filled with the desiccant 140 capable of adsorbing the moisture and the like in the gas. The other space 110r among the two spaces 110r and 110f in the case 110 partitioned by the filter 130 is maintained to be hollow.

Here, adsorbent that adsorbs the moisture and the like in the gas includes reversible adsorbent and irreversible adsor-bent. The reversible adsorbent can recover hygroscopicity by performing vacuum drying and the like even when the reversible adsorbent adsorbs moisture and the hygroscopic-ity thereof is reduced. The irreversible adsorbent cannot recover once reduced hygroscopicity by vacuum drying and the like, and has difficulty in reproducing at a temperature of 80° or less, which is an upper limit value of the heat resistance of the magnetic disk device 10. In contrast, the irreversible adsorbent can maintain the hygroscopicity even in a low-humidity environment with a humidity of 10% or less in which the reversible adsorbent does not function.

In the magnetic disk device 10 of the first embodiment, irreversible adsorbent having excellent hygroscopicity even in a low-humidity environment although recovery of reduced hygroscopicity is difficult is used as the desiccant 140. For example, synthetic zeolite such as molecular sieves can be used as the desiccant 140 having irreversibility.

The space 110f filled with the desiccant 140 and the space 110r maintained to be hollow among the two spaces 110r and 110f in the case 110 partitioned by the filter 130 are examples of a first chamber and a second chamber, respec-tively.

A needle 216 is provided on the bottom wall 211 of the base 21 constituting the housing 20 of the magnetic disk device 10, and protrudes into the empty space in the housing 20 that houses the desiccant assembly 100. More specifi-cally, the needle 216 is provided at a position where the needle 216 vertically overlaps the opening 111 provided in the case 110 of the desiccant assembly 100, and has a protrusion height located above the lower surface of the case 110, that is, a surface facing the base 21.

The needle 216 is made of the same metal as the base 21, such as aluminum alloy and stainless steel, and is integrated with the base 21. This enables reduction in the number of components of the magnetic disk device 10. Note, however, that the needle 216 may be made of a material different from that of the base 21, such as resin and other metal, and may be attached to the base 21 as a part separate from the base 21.

The needle 216 penetrates the sealing film 120 of the desiccant assembly 100. An upper end of the needle 216 reaches the space 110r in the case 110 of the desiccant assembly 100.

The penetration of the needle 216 as described above breaks a part of the sealing film 120 to generate a gap. The gap causes the space 110r in the case 110 of the desiccant assembly 100 to communicate with the internal space of the housing 20. This enables the desiccant 140 filling the case 110 of the desiccant assembly 100 to absorb moisture in the housing 20 via the filter 130, the space 110r in the case 110, and the gap of the sealing film 120.

Dust and the like that can be generated from the desiccant 140 can be removed through the filter 130 by exposing the desiccant 140 to an atmosphere in the housing 20 via the filter 130, which inhibits contamination in the housing 20.

(Method of Manufacturing Magnetic Disk Device)

Next, a method of manufacturing the magnetic disk device 10 of the first embodiment will be described with reference to FIGS. 3A to 4B. FIGS. 3A to 4B are schematic views illustrating one example of a procedure of the method of manufacturing the magnetic disk device 10 according to the first embodiment.

In a process of manufacturing the magnetic disk device 10, the plurality of magnetic disks 12, the spindle motor 13, the magnetic heads 14, the HSA 15, the VCM 16, the ramp load mechanism 17, and the FPC 18 are first assembled so as to be able to operate as the magnetic disk device 10 in the base 21 in which the needle 216 is provided. That is, the magnetic disks 12, the spindle motor 13, the magnetic heads 14, the HSA 15, the VCM 16, the ramp load mechanism 17, and the FPC 18 are housed so as to be able to operate in the space in the base 21.

In contrast, the desiccant assembly 100 is attached to the inner surface of the inner cover 22. Furthermore, the inner cover 22 is caused to overlap the above-described base 21 with, for example, a gasket (not illustrated) being interposed therebetween. The screws 224 are inserted into the insertion holes 223 of the inner cover 22, and fixed to the screw holes 213 of the base 21. Furthermore, the seals 225 is attached to the insertion holes 223 provided in the recesses 221 near the center of the inner cover 22 after the screws are tightened. Furthermore, in the case, the PCB 19 connected to the FPC 18 is also attached to the back surface or the like of the base 21 by these screws 224.

Figure 3A:
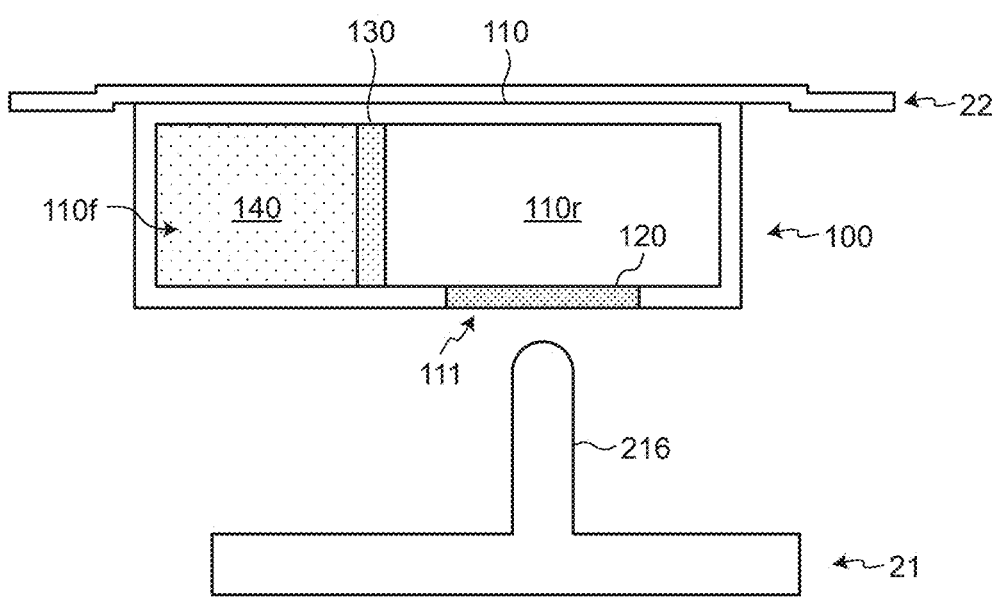
FIGS. 3A and 3B are schematic views illustrating one example of a procedure of a method of manufacturing the magnetic disk device according to the first embodiment.
Figure 3B:
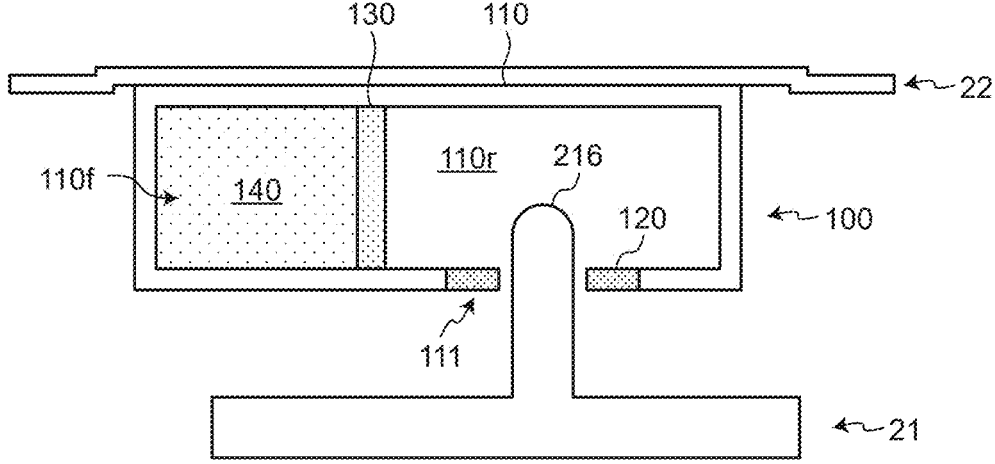

As described above, the inner cover 22 is airtightly attached to the base 21. FIGS. 3A and 3B are cross-sectional views illustrating how the inner cover 22 is attached to the base 21.

As illustrated in FIG. 3A, the inner surface of the inner cover 22 to which the desiccant assembly 100 is attached is caused to face the base 21 that houses the magnetic disks 12 and the like. A position of attachment of the desiccant assembly 100 to the inner cover 22 is provided in the case 110, and adjusted so that the opening 111 into which the sealing film 120 is fitted vertically overlaps the needle 216 provided on the base 21.

Furthermore, in a stage in FIG. 3A, the sealing film 120 fitted into the opening 111 seals the case 110 of the desiccant assembly 100, and a dry state in which at least moisture and the like are not contained is maintained.

As illustrated in FIG. 3B, the needle 216 provided on the base 21 breaks the sealing film 120 of the opening 111 of the case 110 by causing the inner cover 22 to overlap the base 21. A gap is generated in a part of the sealing film 120. Furthermore, the lower surface of the case 110 is located above the bottom wall 211 without being in contact with the bottom wall 211 of the base 21 with the inner cover 22 overlapping the base 21. A gap is generated between the case 110 and the bottom wall 211 of the base 21.

This causes the space 110r in the case 110 to communicates with the space between the inner cover 22 and the base 21 without the bottom wall 211 of the base 21 closing the opening 111 of the case 110. Therefore, the desiccant 140 filling the case 110 is exposed to an atmosphere of the internal space formed by the inner cover 22 and the base 21 via the filter 130, the space 110r in the case 110, and the gap of the sealing film 120.

The internal space formed by the inner cover 22 and the base 21 is initially filled with air containing moisture and the like. Immediately after the inner cover 22 is tightened to the base 21 by the screws, however, air between the inner cover 22 and the base 21 is sucked from the vent 222 provided in the inner cover 22. Furthermore, He gas or the like fills the space between the inner cover 22 and the base 21 from the vent 222.

Note, however, that the air in the space may be discharged from another hole provided in the inner cover 22 by filling the space between the inner cover 22 and the base 21 with He gas or the like from the vent 222 using the other hole together, for example. Examples of the other hole that can be provided in the inner cover 22 include a dust measuring port (not illustrated).

After the inner cover 22 and the base 21 are assembled, discharge of air and filling with He gas or the like as described above are quickly performed. This enables progress of adsorption of moisture in air, which is started by the desiccant 140 at the timing when the needle 216 penetrates the sealing film 120, to be inhibited to a short time, and can inhibit a deterioration in the hygroscopicity of the desiccant 140.

Figure 4A:
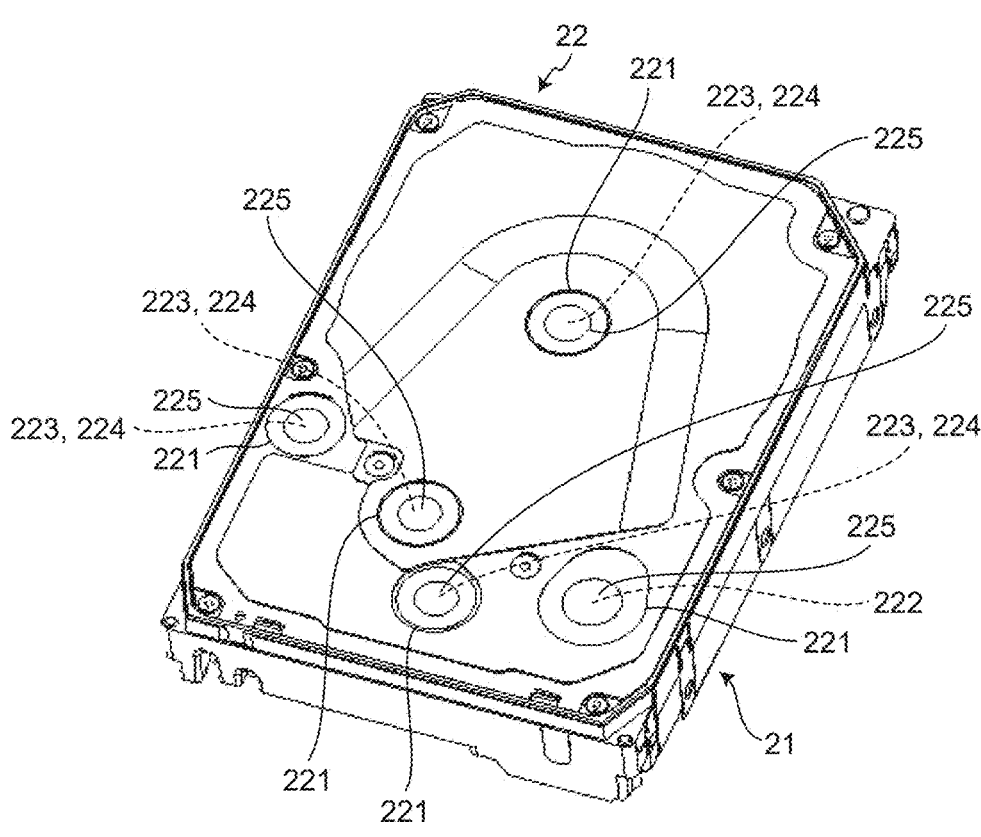
FIGS. 4A and 4B are schematic views illustrating one example of the procedure of the method of manufacturing the magnetic disk device according to the first embodiment.

As illustrated in FIG. 4A, the seals 225 are then attached to the vent 222 of the inner cover 22. As described above, when a seal 225 closes the vent 222, the internal space formed by the inner cover 22 and the base 21 is sealed in a state of being filled with He gas or the like.

Figure 4B:
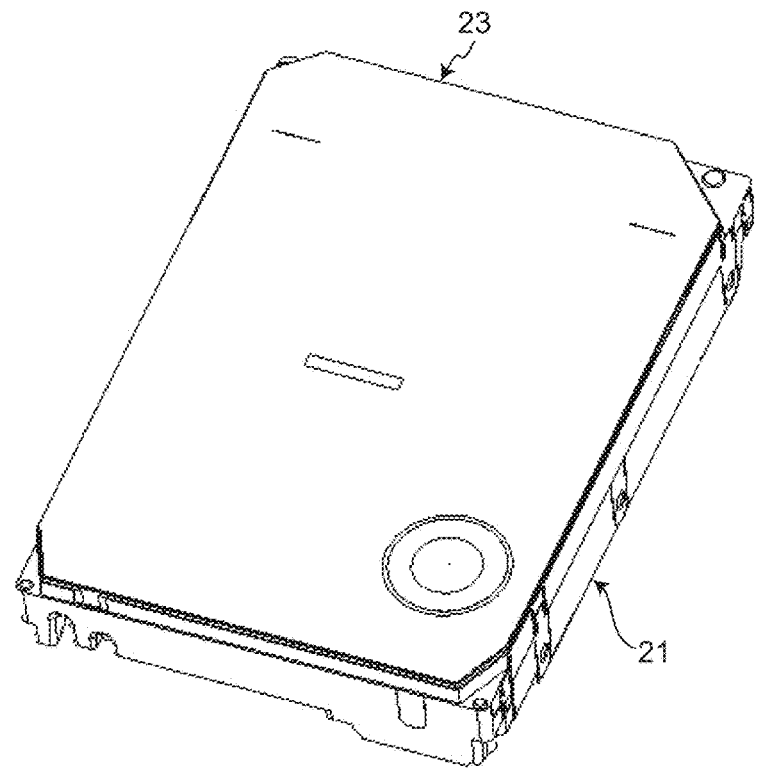

As illustrated in FIG. 4B, the outer cover 23 is caused to further overlap the inner cover 22. The outer cover 23 is welded to the end of the side wall 212 of the base 21.

As described above, the magnetic disk device 10 of the first embodiment is manufactured.

As described above, the desiccant assembly 100 is maintained in a sealed state until immediately before the inner cover 22 is attached to the base 21. Furthermore, after the needle 216 opens the desiccant assembly 100 at the time when the base 21 and the inner cover 22 are assembled, air in the internal space formed by the base 21 and the inner cover 22 is quickly replaced with He gas or the like. This can inhibit exposure of the desiccant 140 to an atmosphere in the manufacturing process to a short time to obtain the magnetic disk device 10 in which the desiccant 140 maintaining high hygroscopicity is enclosed.

Overview

In recent years, in large-capacity magnetic disk devices, He-sealed HDDs in which He gas or the like is enclosed in a housing have become the mainstream. In the He-sealed HDDs, humidity control in the housing for enhancing reliability of the magnetic disk devices is an important issue. Humidity may have an influence more remarkably in an HDD in a heat-assisted magnetic recording (HAMR) type in which information is written by a thermal assist.

Therefore, in a He-sealed HDD, for example, desiccant is enclosed to control humidity in a housing. If time during which the desiccant is exposed to an atmosphere is prolonged in a process of assembling a magnetic disk device, the desiccant may be enclosed with hygroscopicity thereof being deteriorated, or the desiccant may be saturated before the housing is sealed.

One of prior arts discloses a method of housing a case containing desiccant in a device with the case being sealed by an aluminum seal and opening the desiccant by making a hole in the aluminum seal in the device via a hole of a cover. In the method of the above prior art, however, a hole making process is required to be added. Unfortunately, the addition of the hole making process prolongs a cycle time.

According to the magnetic disk device 10 of the first embodiment, the desiccant assembly 100 includes the case 110, the sealing film 120, the filter 130, and the desiccant 140. The case 110 has the opening 111 on a surface facing the base 21. The sealing film 120 covers the opening 111. The filter 130 divides the space in the case 110 into the space 110f and the space 110r having the opening 111. The space 110f is filled with the desiccant 140. The space 110r communicates with the internal space of the housing 20 by the needle 216 provided on the base 21 penetrating the sealing film 120.

This enables the desiccant 140 maintaining hygroscopicity to be enclosed. Therefore, humidity in the housing 20 can be strictly controlled. Reliability of the magnetic disk device 10 can be improved. In the magnetic disk device 10 of an HAMR type, the reliability can be further improved.

According to the magnetic disk device 10 of the first embodiment, the filter 130 extends in a direction intersecting the inner surface of the inner cover 22, and divides the space in the case 110 in the direction along the inner surface of the inner cover 22. The two spaces 110r and 110f obtained by the division are arranged side by side in the direction along the inner surface of the inner cover 22. The desiccant 140 can absorb moisture in the internal space of the housing 20 via the filter 130, the space 110r, and the gap of the sealing film 120 provided in the opening 111 by arranging the two spaces 110r and 110f as described above.

According to the method of manufacturing the magnetic disk device 10 of the first embodiment, the base 21 and the inner cover 22 overlap each other. The needle 216 protruding from the side of the base 21 abuts on the sealing film 120. At least a part of the sealing film 120 is removed from the opening 111 of the case 110 by the needle 216. The space 110r in the case 110 thereby communicates with the internal space of the housing 20. The desiccant assembly 100 is disposed so as to face the base 21 at a position away from the base 21 by a predetermined distance.

This enables the desiccant 140 to be sealed immediately before the inner cover 22 and the base 21 are assembled. This can inhibit exposure of the desiccant 140 to an atmosphere to a short time. The magnetic disk device 10 in which the desiccant 140 maintaining hygroscopicity is enclosed can be obtained.

Furthermore, the desiccant assembly 100 can be easily opened at the same time when the inner cover 22 and the base 21 are assembled. A dedicated tool for opening the desiccant assembly 100 is unnecessary unlike in the case of the above prior art. Furthermore, the cycle time can be shortened without increasing the number of manufacturing processes. Forgetting to open the desiccant assembly 100 can be also prevented.

Furthermore, the desiccant assembly 100 is disposed away from the base 21 by a predetermined distance, which inhibits the bottom wall 211 of the base 21 from closing the opening 111 of the case 110. After assembling of the housing 20, the desiccant 140 can collect moisture in the housing 20.

Variation 1

Next, a desiccant assembly 100a of Variation 1 of the first embodiment will be described with reference to FIGS. 5A and 5B. The desiccant assembly 100a of Variation 1 is different from the desiccant assembly 100 of the above-described first embodiment in the mechanism of opening.

Figure 5A:
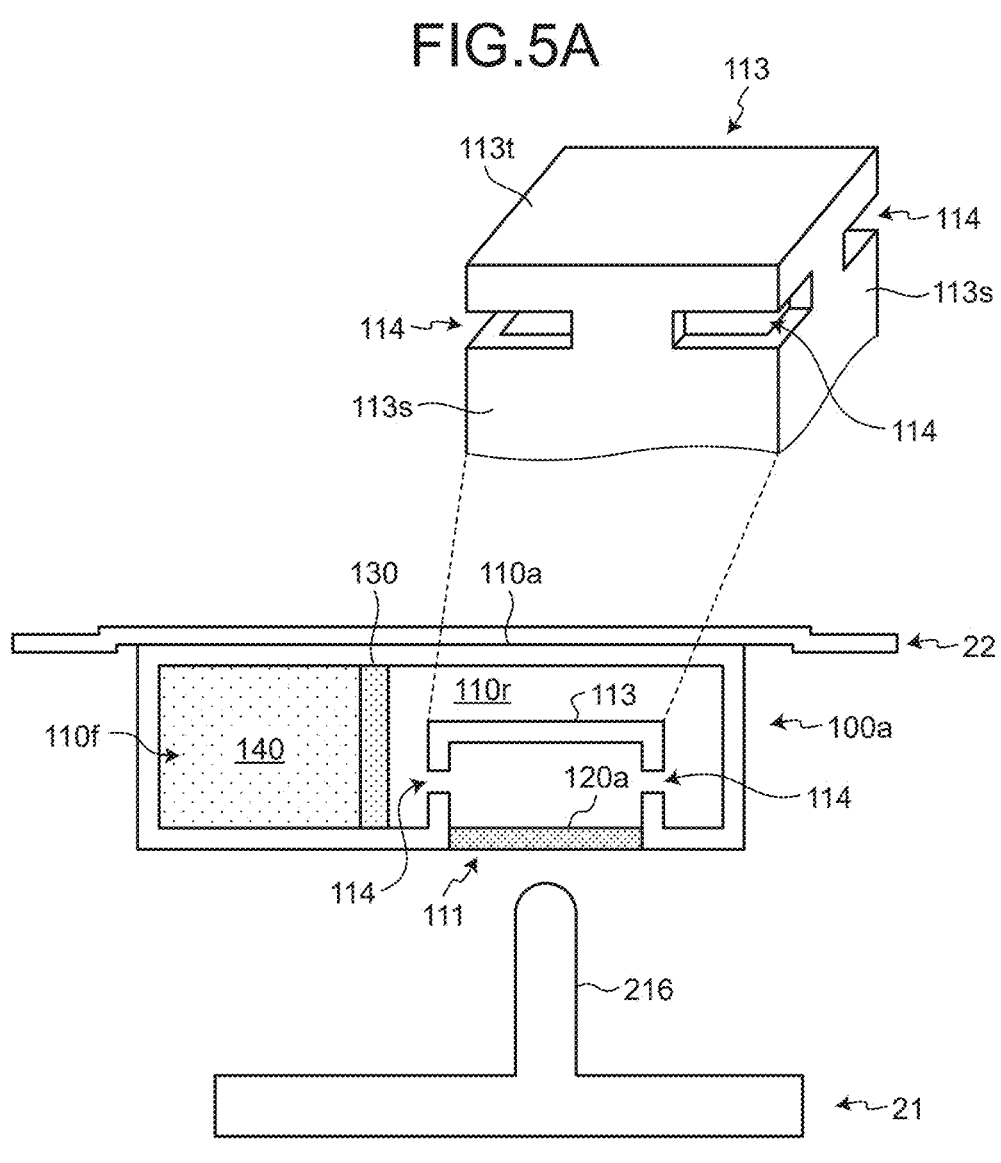
FIGS. 5A and 5B are schematic views illustrating how a desiccant assembly according to Variation 1 of the first embodiment is assembled to a base.
Figure 5B:
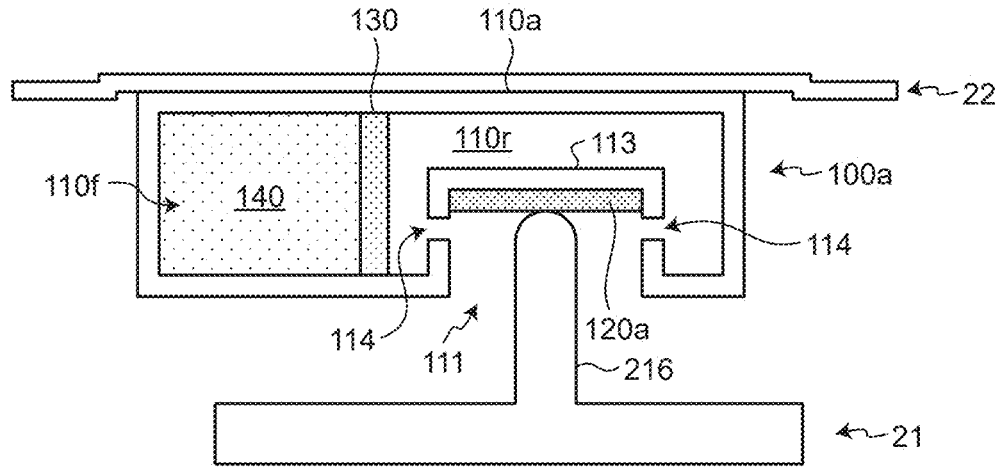

FIGS. 5A and 5B are schematic views illustrating how the desiccant assembly 100a according to Variation 1 of the first embodiment is assembled to the base 21. Note that, in the following drawings, the same reference signs are attached to the same configurations as those of the above-described first embodiment, and description thereof may be omitted.

As illustrated in FIG. 5A, the desiccant assembly 100a of Variation 1 includes a case 110a having an inner chamber 113. The inner chamber 113 of the case 110a is provided in the space 110r, and has a shape of box covering the opening 111.

That is, the inner chamber 113 has a side wall 113s and an inner lid 113t. The side wall 113s surrounds an outer edge of the opening 111. The inner lid 113t is provided at an upper end of the side wall 113s so as to cover the opening 111, and serves as an upper surface of the inner chamber 113. One or more openings 114 are provided in the side wall 113s of the inner chamber 113. The openings 114 are provided in the side wall 113s as described above, so that the internal space of the box-shaped inner chamber 113 communicates with the space 110r in the case 110a.

Furthermore, the inner lid 113t of the inner chamber 113 is preferably disposed at a height position substantially equal to that of the upper end of the needle 216 that is to protrude into the space 110r of the case 110a with the inner cover 22 being assembled to the base 21 or a position slightly higher than that of the upper end of the needle 216.

A sealing film 120a is fitted into the opening 111 of the case 110a. The sealing film 120a has sealability, and prevents transmission of air, gas such as He, moisture in the gas, and the like. The sealing film 120a is a thin film made of a resin, such as silicone rubber and fluororubber.

In a stage in FIG. 5A, the sealing film 120a fitted into the opening 111 of the case 110a seals the case 110a of the desiccant assembly 100a, and a dry state in which at least moisture and the like are not contained is maintained.

As illustrated in FIG. 5B, when the inner cover 22 to which the desiccant assembly 100a is attached is caused to overlap the base 21, the needle 216 provided on the base 21 abuts on the sealing film 120a. As described above, the sealing film 120a has a relatively tough material such as resin. Thus, the sealing film 120a is pushed upward by the needle 216 without being broken, and sandwiched between the upper end of the needle 216 and the inner lid 113t of the inner chamber 113.

As described above, the opening 111 of the case 110a is opened by removing the sealing film 120a with the needle 216 to cause the space 110r in the case 110a to communicate with the space between the inner cover 22 and the base 21.

According to the magnetic disk device of Variation 1, the desiccant assembly 100a includes the case 110a, the inner lid 113t, and the sealing film 120a. The case 110a has the opening 111 on the surface facing the base 21. The inner lid 113t is disposed above the opening 111. The sealing film 120a is pressed against a surface facing the opening 111 of the inner lid 113t. The needle 216 is inserted into the space 110r in the case 110a through the opening 111, and abuts on a lower surface of the inner lid 113t via the sealing film 120a. This enables the desiccant 140 maintaining hygroscopicity to be enclosed.

According to the magnetic disk device of Variation 1, other effects similar to those of the magnetic disk device 10 of the first embodiment described above are obtained.

Variation 2

Next, a magnetic disk device of Variation 2 of the first embodiment will be described with reference to FIG. 6. The magnetic disk device of Variation 2 includes a needle 216d having a shape different from that of the needle 216 of the first embodiment described above.

Figure 6:
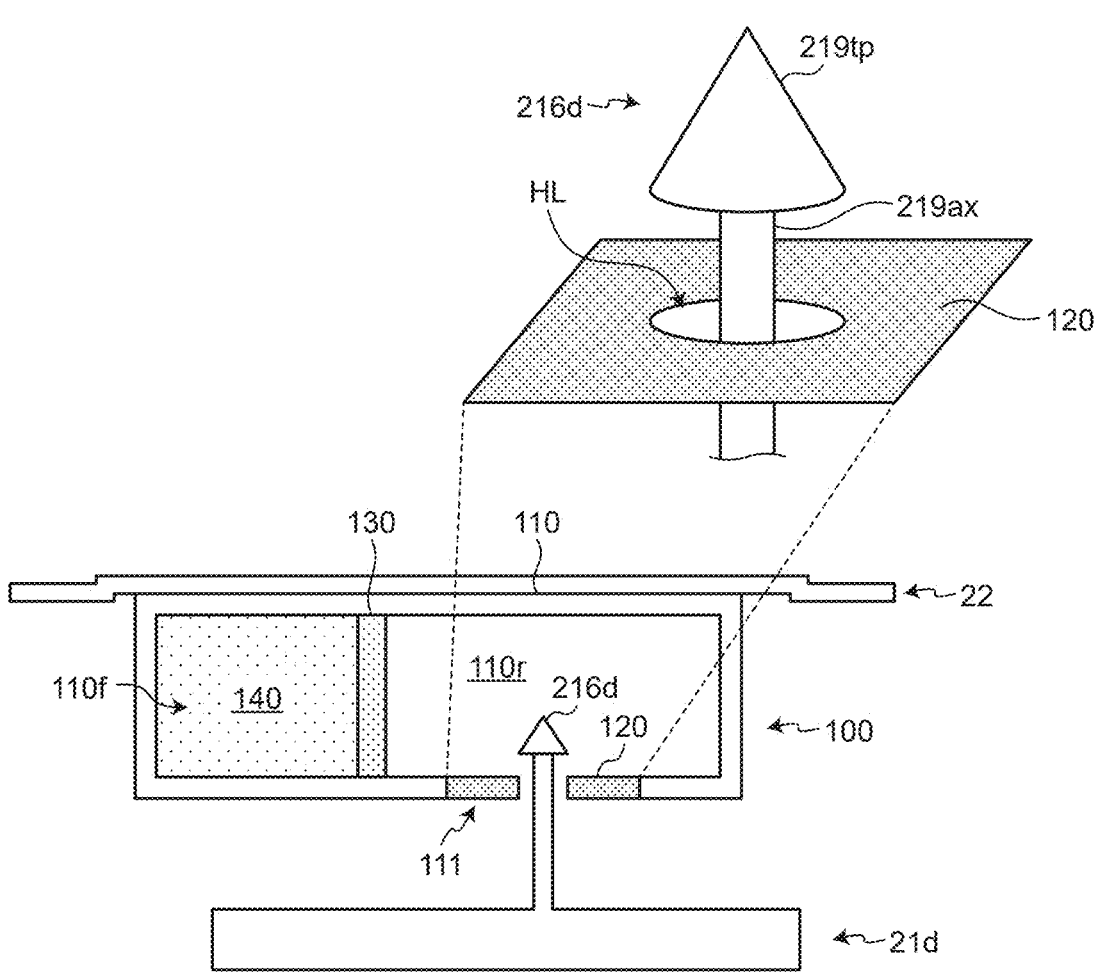
FIG. 6 is a schematic view illustrating one example of a needle of the magnetic disk device according to Variation 2 of the first embodiment.

FIG. 6 is a schematic view illustrating one example of the needle 216d of the magnetic disk device according to Variation 2 of the first embodiment. Note that, in the following drawings, the same reference signs are attached to the same configurations as those of the above-described first embodiment, and description thereof may be omitted.

As illustrated in FIG. 6, a base 21d of Variation 2 includes the needle 216d including an extending portion 219ax and a piercing portion 219tp. The extending portion 219ax corresponds to a main body portion of the needle 216d. The extending portion 219ax penetrates the sealing film 120, and extends in the vertical direction of the sealing film 120. The piercing portion 219tp is located at an upper end portion of the extending portion 219ax. The piercing portion 219tp at least partially has a portion having a transverse section larger than that of the extending portion 219ax. As in an example in FIG. 6, the piercing portion 219tp may have a shape with a pointed tip portion, such as a conical shape.

Such a shape of the needle 216d of Variation 2 causes the piercing portion 219tp of the needle 216d to penetrate the sealing film 120 at the time when the inner cover 22 and the base 21d are assembled. A larger hole HL is thereby made in the sealing film 120. Furthermore, after the inner cover 22 and the base 21d are assembled, the extending portion 219ax having a smaller cross-sectional area than the piercing portion 219tp is located in the hole HL provided in the sealing film 120.

According to the magnetic disk device of Variation 2, the needle 216d includes the extending portion 219ax and the piercing portion 219tp. The extending portion 219ax extends through the sealing film 120. The piercing portion 219tp is provided at the upper end of the needle 216d, and has a cross-sectional area at least partially larger than the extending portion 219ax. This enables the larger hole HL to be provided in the sealing film 120. Hygroscopic efficiency of the desiccant 140 can be further enhanced by collecting moisture in the housing via the hole HL.

According to the magnetic disk device of Variation 2, other effects similar to those of the magnetic disk device 10 of the first embodiment described above are obtained.

Second Embodiment

A second embodiment will be described in detail below with reference to the drawings. A magnetic disk device of the second embodiment includes a desiccant assembly having a configuration different from that of the first embodiment. Note that, in the following drawings, the same reference signs are attached to the same configurations as those of the first embodiment, and description thereof may be omitted.

(Configuration Example of Magnetic Disk Device)

FIGS. 7A to 7C are exemplary perspective views illustrating a magnetic disk device 30 according to the second embodiment in an exploded manner. More specifically, FIG. 7A illustrates the inside of a base 21e of the magnetic disk device 30. FIG. 7B illustrates the inner surface of an inner cover 22 of the magnetic disk device 30. Furthermore, FIG. 7C is a transparent perspective view of the magnetic disk device 30.

As illustrated in FIG. 7A, magnetic disks 12, a spindle motor 13, magnetic heads 14, an HSA 15, a VCM 16, a ramp load mechanism 17, and an FPC plate 215 are housed in the base 21e of the magnetic disk device 30. Further, as in the above-described first embodiment, an FPC 18 (see FIG. 1) is housed in the base 21e of the magnetic disk device 30.

As described above, the FPC plate 215 is a resin member for supporting and reinforcing the FPC 18, and is disposed on the bottom wall 211 of the base 21e. In the second embodiment, a needle 216e is provided on the upper surface of the FPC plate 215. The needle 216e can be easily mounted in a limited space in the base 21e by providing the needle 216e on the FPC plate 215.

The needle 216e of the second embodiment is made of resin as in the case of the FPC plate 215, for example. The needle 216e is integrated with the FPC plate 215. This enables reduction in the number of components of the magnetic disk device 30. Note, however, that the needle 216e may be made of a material, such as metal, different from that of the FPC plate 215, and embedded in the FPC plate 215.

As illustrated in FIG. 7B, a desiccant assembly 300 of the second embodiment is attached to the inner surface of the inner cover 22 of the magnetic disk device 30, that is, a surface facing the base 21e in a state of being assembled to the base 21e. More specifically, the desiccant assembly 300 is attached to the inner surface of the inner cover 22 at a position overlapping the vent 222 provided in the inner cover 22.

As illustrated in FIG. 7C, the desiccant assembly 300 is disposed at a position where the desiccant assembly 300 vertically overlaps the needle 216e of the FPC plate 215 installed on the base 21e with the base 21e and the inner cover 22 being assembled.

(Configuration Example of Desiccant Assembly)

Next, a detailed configuration example of the desiccant assembly 300 of the second embodiment will be described with reference to FIGS. 8A to 8Db.

FIGS. 8A to 8Db are schematic views illustrating one example of a configuration of the desiccant assembly 300 according to the second embodiment. FIGS. 8A to 8Db illustrate a configuration example of the desiccant assembly 300 alone before attachment to the inner cover 22.

More specifically, FIG. 8A is a perspective view illustrating the entire configuration of the desiccant assembly 300. FIG. 8B is a perspective cross-sectional view illustrating the entire configuration of the desiccant assembly 300. FIGS. 8Ca and 8Cb illustrate a case 310 of the desiccant assembly 300. FIG. 8Ca is a perspective view of the case 310. FIG. 8Cb is a top view of the case 310. FIGS. 8Da and 8Db illustrate a sealing film 320 to be attached to the case 310 of the desiccant assembly 300. FIG. 8Da is a perspective view on a back surface side of the sealing film 320. FIG. 8Db is a perspective view on an upper surface side of the sealing film 320.

As illustrated in FIG. 8A, the desiccant assembly 300 before attachment includes the case 310, the sealing film 320, and a release sheet 360. The case 310 has, for example, a columnar shape having substantially flat upper and lower surfaces. The sealing film 320 is attached to the lower surface of the case 310, that is, a surface to face the FPC plate 215 on the base 21e at the time of attachment to the inner cover 22. The release sheet 360 is attached to the upper surface of the case 310, that is, a surface of attachment to the inner cover 22.

As illustrated in FIG. 8B, the case 310 has an opening 311 on the lower surface, and has flow paths 312 and vents 313 on the upper surface. A filter 330 is provided in the case 310. The filter 330 extends in a direction along the upper and lower surfaces of the case 310, and divides space in the case 310 into two spaces 310r and 310f in the vertical direction. Note, however, that the case 310 itself may include two cases including the spaces 310r and 310f. In this case, these two cases may be integrated as the case 310 including the two spaces 310r and 310f by bonding the two cases via the filter 330 or fitting the two cases into each other.

As in the case of the filter 130 of the first embodiment described above, the filter 330 is a membrane filter made of PTFE, for example. The filter 330 can transmit air, gas such as He, moisture in the gas, and the like. Note that the filter 330 of the second embodiment is one example of a division filter that divides the space in the case 310 into the two spaces 310r and 310f.

The space 310r among the two spaces 310r and 310f in the case 310 partitioned by the filter 330 has the opening 311 which the case 310 has on the lower surface, and is disposed on the lower surface side of the case 310. The sealing film 320 is attached to the lower surface of the case 310 so as to cover the opening 311 and seal the space 310r and the like in the case 310.

The space 310f among the two spaces 310r and 310f in the case 310 partitioned by the filter 330 includes the vents 313 and the like which the case 310 has on the upper surface, and is disposed on the upper surface side of the case 310. The release sheet 360 is attached to the upper surface of the case 310 by an annular double-sided tape 350. The release sheet 360 is a thin film made of, for example, aluminum.

The double-sided tape 350 has an annular shape as described above. An outer edge of the release sheet 360 is attached to an outer edge of the upper surface of the case 310 around the flow paths 312 and the vents 313. This causes the release sheet 360 to cover the flow paths 312 and the vents 313 to seal the space 310f and the like in the case 310.

The space 310f in the case 310 is filled with desiccant 340. Also in the second embodiment, for example, irreversible adsorbent including synthetic zeolite such as molecular sieves can be used as the desiccant 340. Furthermore, the filter 330 of the second embodiment has a function of collecting dust generated from the desiccant 340. In contrast, the space 310r in the case 310 is maintained to be hollow.

The space 310f filled with the desiccant 340 and the space 310r maintained to be hollow among the two spaces 310r and 310f in the case 310 partitioned by the filter 330 are examples of a first chamber and a second chamber, respectively.

As illustrated in FIGS. 8Ca and 8Cb, a plurality of flow paths 312 on the upper surface of the case 310 extends radially from, for example, a central portion. The vents 313 penetrating the upper surface of the case 310 in the plate thickness direction are connected to ends of the plurality of radially extending flow paths 312. As described above, the release sheet 360 attached on the upper surface of the case 310 closes these flow paths 312 and the vents 313.

As illustrated in FIGS. 8Da and 8Db, the sealing film 320 attached to the lower surface of the case 310 is a thin film made of, for example, aluminum.

A thin portion 321 obtained by further thinning the thin sealing film 320 is provided in a central portion of a back surface side of the sealing film 320, that is, a surface that is to face the FPC plate 215 on the base 21e at the time of attachment to the inner cover 22. As illustrated in FIG. 8Da, the thin portion 321 has a shape such as a cross shape so as to be easily broken by the needle 216e of the FPC plate 215.

An adhesive layer 322 such as an adhesive is annularly provided on an outer peripheral portion on the upper surface side of the sealing film 320, that is, a surface on a side to be attached to the lower surface of the case 310. The sealing film 320 closes the opening 311 to seal the space 310r and the like in the case 310 by bonding the sealing film 320 on the outer edge of the lower surface of the case 310 around the opening 311 of the case 310 with the adhesive layer 322. Furthermore, the annular adhesive layer 322 is disposed around the opening 311 of the case 310, which does not prevent the needle 216e of the FPC plate 215 from penetrating the sealing film 320, and inhibits the adhesive layer 322 from causing contamination after the sealing film 320 is broken.

As described above, the sealing film 320 and the adhesive layer 322 are configured as, for example, an aluminum seal as a whole.

The above-described configuration causes the case 310 of the desiccant assembly 300 to be sealed by the sealing film 320 attached to the opening 311 and the release sheet 360 attached to the flow paths 312 and the vents 313 in the desiccant assembly 300 alone before attachment to the inner cover 22, and maintains a dry state not containing at least moisture and the like.

(Method of Manufacturing Magnetic Disk Device)

Figure 9:
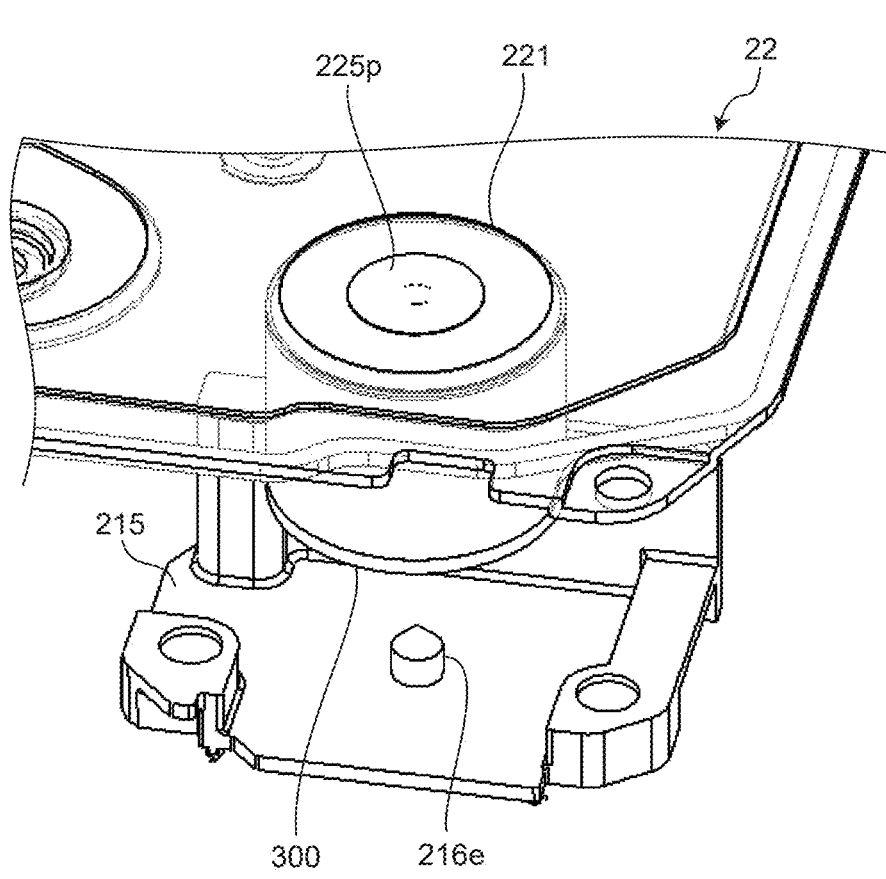
FIG. 9 is a schematic view illustrating one example of a procedure of a method of manufacturing the magnetic disk device according to the second embodiment.
Figures 10A, 10B:
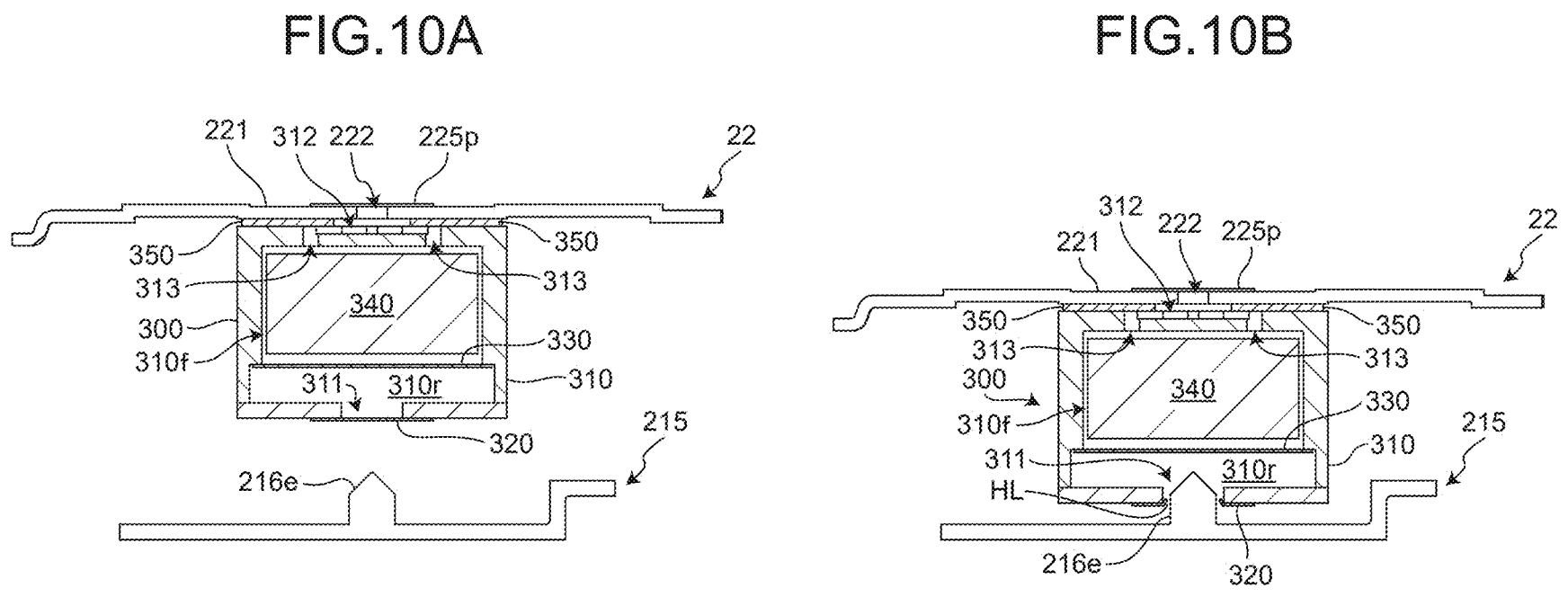

Next, a method of manufacturing the magnetic disk device 30 of the second embodiment will be described with reference to FIGS. 9 to 10B. FIGS. 9 to 10B are schematic views illustrating one example of a procedure of the method of manufacturing the magnetic disk device 30 according to the second embodiment.

Also in the second embodiment, the plurality of magnetic disks 12, the spindle motor 13, the magnetic heads 14, the HSA 15, the VCM 16, the ramp load mechanism 17, and the FPC 18 are assembled so as to be able to operate as the magnetic disk device 10 in the base 21e. In the case, the needle 216e is provided, and the FPC plate 215 that supports the FPC 18 is also installed in the base 21e.

In contrast, the desiccant assembly 300 is attached to the inner surface of the inner cover 22.

That is, the release sheet 360 of the desiccant assembly 300 is released to expose the double-sided tape 350 on the upper surface of the case 310. In the case, the desiccant 340 in the case 310 is exposed to an atmosphere via the flow paths 312 and the vents 313. A process of attaching the desiccant assembly 300 to the inner cover 22 is preferably performed immediately before the inner cover 22 is assembled to the base 21e.

Furthermore, when the release sheet 360 is released and the desiccant 340 is exposed to an atmosphere, air spreads radially from the central portion of the case 310 through the flow paths 312, and reaches the desiccant 340 via the vents 313. This prevents the air from flowing into the desiccant 340 at once, and inhibits rapid progress of hygroscopic reaction of the desiccant 340. The rapid hygroscopic reaction of the desiccant 340 may remarkably deteriorate the hygroscopicity of the desiccant 340.

The desiccant assembly 300 from which the release sheet 360 has been released is attached to the inner surface of the inner cover 22 by the double-sided tape 350. In the case, the position of attachment of the desiccant assembly 300 is adjusted such that the central portion on the upper surface of the case 310 overlaps the vent 222 provided in the inner cover 22.

Note that the vents 313 provided in the case 310 are examples of second vents. The vent 222 provided in the inner cover 22 and connected to the vents 313 of the case 310 are examples of a first vent.

Even after the desiccant assembly 300 is attached to the inner surface of the inner cover 22, the desiccant 340 in the case 310 is continuously exposed to external air via the flow paths 312 and the vents 313 provided in the case 310 and the vent 222 of the inner cover 22. Therefore, a temporary fixing seal 225p is attached to the vent 222 of the inner cover 22 to which the desiccant assembly 300 is attached until the inner cover 22 is assembled to the base 21e.

As described above, the inner cover 22 to which the desiccant assembly 300 is attached is attached to the base 21e on which the plurality of magnetic disks 12 and the like are housed and the FPC plate 215 is installed. FIGS. 10A and 10B are cross-sectional views illustrating the state.

As illustrated in FIG. 10A, the inner surface of the inner cover 22 to which the desiccant assembly 300 is attached is caused to face the base 21e that houses the magnetic disks 12 and the like. The desiccant assembly 300 is attached at the position of the vent 222 of the inner cover 22, so that the opening 311 provided in the case 310 and attached to the sealing film 320 is disposed so as to vertically overlap the needle 216e provided on the FPC plate 215 of the base 21e.

Furthermore, in a stage in FIG. 10A, the case 310 of the desiccant assembly 300 is sealed by the sealing film 320 attached to the opening 311 and the temporary fixing seal 225p attached to the vent 222 of the inner cover 22.

As illustrated in FIG. 10B, the needle 216e provided on the FPC plate 215 of the base 21e breaks the sealing film 320 that closes the opening 311 of the case 310 by causing the inner cover 22 to overlap the base 21e. A gap is generated in a part of the sealing film 320. Furthermore, the lower surface of the case 310 is located above the FPC plate 215 with the inner cover 22 overlapping the base 21e without being in contact with the upper surface of the FPC plate 215. A gap is generated between the case 310 and the upper surface of the FPC plate 215.

This causes the space 310r in the case 310 to communicate with the space between the inner cover 22 and the base 21e without the upper surface of the FPC plate 215 closing the opening 311 of the case 310. Therefore, the desiccant 340 filling the case 310 is exposed to an atmosphere of the internal space formed by the inner cover 22 and the base 21e via the filter 330, the space 310r in the case 310, and the gap of the sealing film 320.

After the inner cover 22 is tightened to the base 21e by screws, air in the internal space between the inner cover 22 and the base 21e is quickly replaced with He gas or the like from the vent 222 provided in the inner cover 22. Also in this case, the space may be filled with He gas or the like after air is discharged. The air may be discharged with filling of the He gas or the like by using another hole such as a dust measuring port together.

Note that it is preferable that the vent 222 of the inner cover 22 to which the desiccant assembly 300 is connected is exclusively used for injecting He gas or the like into the internal space between the inner cover 22 and the base 21e and that air is sucked from the internal space through another hole. Thus, the hygroscopic function of the desiccant 340 enables He gas or the like to flow into the internal space between the inner cover 22 and the base 21e in a drier state.

Also in the case, the filter 330 of the second embodiment exerts a dust collecting function in order to prevent dust in the outside air from flowing into the internal space between the inner cover 22 and the base 21e. Furthermore, the flow paths 312 and the vents 313 provided in the upper surface of the case 310 alleviate the speed of the outside air flowing into the desiccant 340, so that the rapid progress of the hygroscopic reaction of the desiccant 340 is inhibited.

After the internal space between the inner cover 22 and the base 21e is filled with He gas or the like, the vent 222 of the inner cover 22 is closed with the seal 225p to seal the internal space formed by the inner cover 22 and the base 21e. The outer cover 23 is caused to further overlap the inner cover 22. The outer cover 23 is welded to the end of the side wall 212 of the base 21e.

As described above, the magnetic disk device 30 of the second embodiment is manufactured.

Overview

According to the magnetic disk device 30 of the second embodiment, the filter 330 of the desiccant assembly 300 extends in the direction along the inner surface of the inner cover 22, and divides the space in the case 310 in a direction intersecting the inner surface of the inner cover 22. The space 310f in the case 310 is disposed between the space 310r in the case 310 and the inner cover 22. The desiccant 340 can absorb moisture in the internal space of the housing via the filter 330, the space 310r, and the gap of the sealing film 320 attached to the opening 311 also by arranging the two spaces 310r and 310f as described above.

According to the magnetic disk device 30 of the second embodiment, the inner cover 22 has the vent 222 that penetrates the inner cover 22. The case 310 of the desiccant assembly 300 has the vents 313 that connect the vent 222 of the inner cover 22 with the space 310f in the case 310 filled with the desiccant 340.

This enables an atmosphere in the internal space between the inner cover 22 and the base 21e to be replaced via the vent 222 of the inner cover 22 and the vents 313 on the upper surface of the case 310. In the case, if the vent 222 is used for inflow of He gas or the like, drier He gas or the like can be injected into the internal space between the inner cover 22 and the base 21e. The vent 222 is provided in the inner cover 22. The desiccant assembly 300 is connected to the vent 222.

According to the magnetic disk device 30 of the second embodiment, the case 310 of the desiccant assembly 300 has the plurality of flow paths 312 radially extending from the position immediately below the vent 222 of the inner cover 22. The vents 313 on the upper surface of the case 310 are connected to the ends of the plurality of flow paths 312. This enables the speed of inflow of the outside air flowing into the desiccant assembly 300 to be lowered via the vent 222 of the inner cover 22, and can inhibit rapid hygroscopic reaction of the desiccant 340 due to the outside air.

The magnetic disk device 30 of the second embodiment further includes the seal 225p that airtightly closes the vent 222 to which the desiccant assembly 300 is connected. This enables the housing of the magnetic disk device 30 to be sealed, and inhibits the inside desiccant 340 from being continuously exposed to an atmosphere.

According to the magnetic disk device 30 of the second embodiment, the needle 216e is provided on the FPC plate 215 disposed on the base 21e. This enables a configuration necessary for opening the desiccant assembly 300 to be mounted in the limited space in the base 21e. Furthermore, since a region in the base 21e on which the FPC plate 215 is installed has relatively spare space, a space for housing the desiccant assembly 300 attached to the inner cover 22 is easily secured.

According to the magnetic disk device 30 of the second embodiment, the sealing film 320 has the thin portion 321 processed to be thinner than other portions at the portion which the needle 216e penetrates. This enables the needle 216e to easily break the sealing film 320.

Note that the sealing film 120 of the desiccant assembly 100 of the first embodiment described above may also have a thin portion as the sealing film 320 of the second embodiment.

According to the magnetic disk device 30 of the second embodiment, other effects similar to those of the magnetic disk device 10 of the first embodiment described above are obtained.

Variation 1

Next, a magnetic disk device of Variation 1 of the second embodiment will be described with reference to FIG. 11. The magnetic disk device of Variation 1 has the needle 216 at a portion different from that in the above-described second embodiment.

Figure 11:
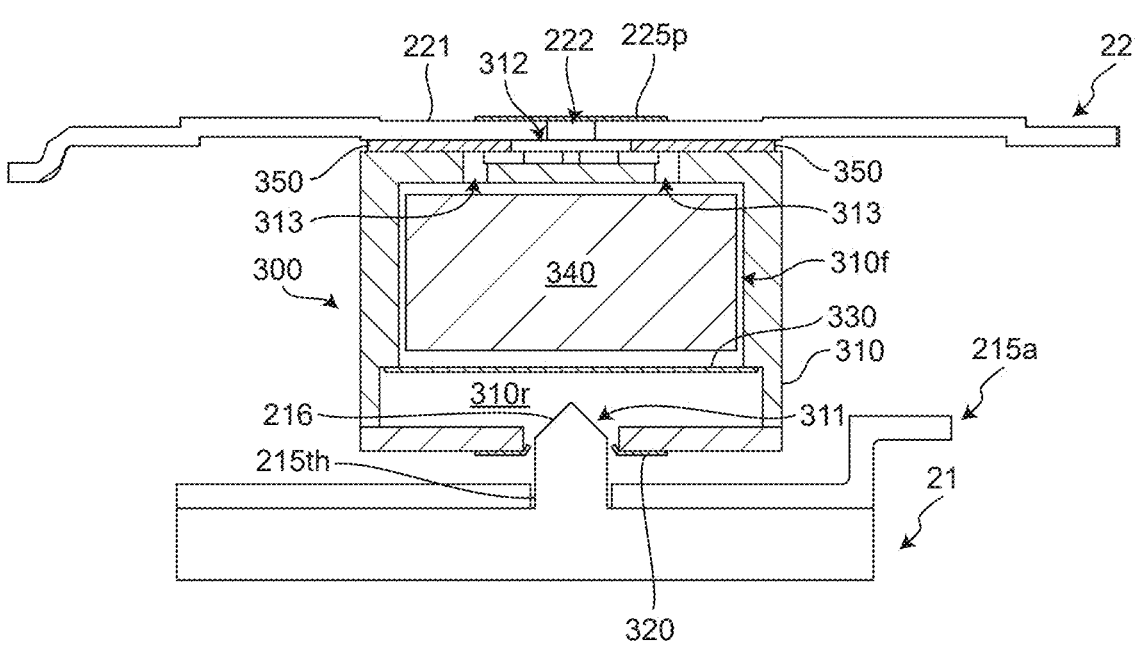
FIG. 11 is a schematic view illustrating one example of a needle of the magnetic disk device according to Variation 1 of the second embodiment.

FIG. 11 is a schematic view illustrating one example of the needle 216 of the magnetic disk device according to Variation 1 of the second embodiment. Note that, in the following drawings, the same reference signs are attached to the same configurations as those of the above-described second embodiment, and description thereof may be omitted.

As illustrated in FIG. 11, the magnetic disk device of Variation 1 has the needle 216 on the base 21 as in the above-described first embodiment. Furthermore, an FPC plate 215a of Variation 1 has a through hole 15th through which the needle 216 provided on the base 21 passes.

According to the magnetic disk device of Variation 1, effects similar to those of the magnetic disk device 30 of the second embodiment described above are obtained also by providing the needle 216 on the base 21.

Note that the desiccant assembly 100 of the first embodiment described above may be disposed on the FPC plate that supports the FPC 18. The needle 216 provided on the base 21 may penetrate the FPC plate 215a of Variation 1 described above and protrude into the housing 20 as a mechanism of opening the desiccant assembly 100. This enables further space saving in the magnetic disk device 10 of the first embodiment.

Furthermore, as in the above-described second embodiment, the needle 216e provided on the upper surface of the FPC plate 215 can be applied as a mechanism of opening the desiccant assembly 100 of the above-described first embodiment.

Variation 2

Next, a desiccant assembly 300a of Variation 2 of the second embodiment will be described with reference to FIGS. 12A and 12B. The desiccant assembly 300a of Variation 2 is different from the desiccant assembly 300 of the second embodiment described above in that the desiccant assembly 300*a* includes a filter 315 also at a lower end.

Figures 12A, 12B:
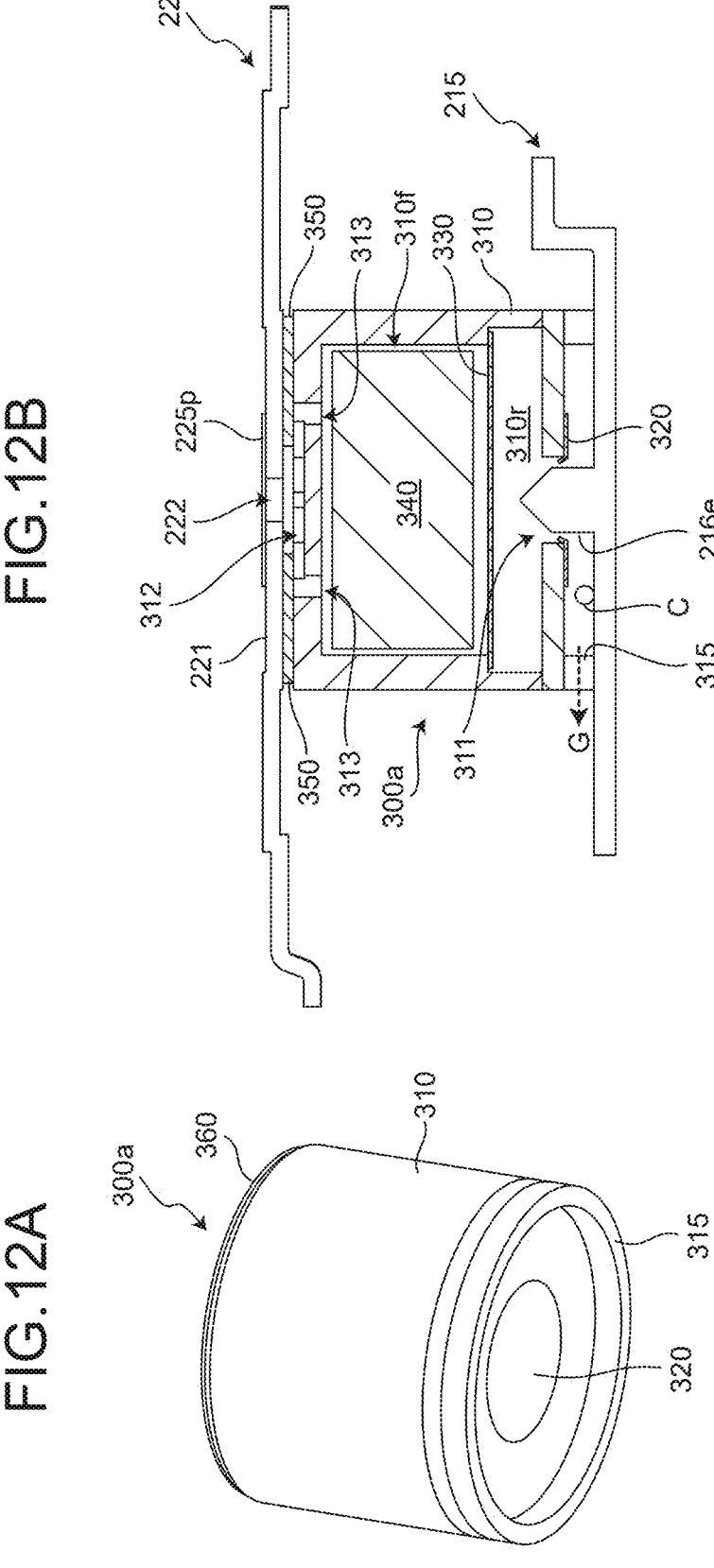
FIGS. 12A and 12B are schematic views illustrating one example of a configuration of the desiccant assembly according to Variation 2 of the second embodiment.

FIGS. 12A and 12B are schematic views illustrating one example of a configuration of the desiccant assembly 300*a* according to Variation 2 of the second embodiment. More specifically, FIG. 12A is a perspective view of the desiccant assembly 300*a* of Variation 2 as viewed from below. FIG. 12B is a cross-sectional view illustrating how the desiccant assembly 300*a* of Variation 2 is mounted in the magnetic disk device.

Note that, in the following drawings, the same reference signs are attached to the same configurations as those of the above-described second embodiment, and description thereof may be omitted.

As illustrated in FIG. 12A, the desiccant assembly 300*a* of Variation 2 includes the filter 315 on a lower surface of the case 310. The filter 315 surrounds the outer edge of the lower surface of the case 310, and has an annular shape protruding from the lower surface of the case 310. The protrusion height of the filter 315 from the lower surface of the case 310 is substantially the same as the height of a gap generated between the lower surface of the desiccant assembly 300*a* and the upper surface of the FPC plate 215 at the time when the desiccant assembly 300*a* is mounted in the magnetic disk device, for example.

As in the case of the filter 330, the filter 315 is a membrane filter made of PTFE, for example. The filter 315 can transmit air, gas such as He, moisture in the gas, and the like.

As illustrated in FIG. 12B, in a state in which the desiccant assembly 300*a* of Variation 2 is mounted in the magnetic disk device, the filter 315 protruding from the lower surface of the case 310 is in contact with the upper surface of the FPC plate 215. The annular filter 315 is in contact with the upper surface of the FPC plate 215. Thus, the filter 315 shields the space between the lower surface of the case 310 and the upper surface of the FPC plate 215 from another internal space of the housing.

Note that the filter 315 of Variation 2 is one example of a shielding filter that shields the space between the case 310 and the base 21*e* from the internal space of the housing.

When the needle 216*e* penetrates the sealing film 320 provided on the lower surface of the case 310, dust C and the like may be generated from the broken sealing film 320. The above-described filter 315 inhibits the dust C scattered in the space between the lower surface of the case 310 and the upper surface of the FPC plate 215 from scattering into the internal space of the housing. Note, however, that the filter 315 transmits air, gas such as He, moisture in the gas, and the like, so that hygroscopic control in the housing performed by the desiccant 340 is not hindered.

According to the magnetic disk device of Variation 2, the desiccant assembly 300*a* further includes the filter 315 that surrounds an outer peripheral portion of a surface facing the base 21*e* of the case 310 and that shields the space between the case 310 and the base 21*e* from the internal space of the housing. This can inhibit, for example, the dust C generated from the sealing film 320 broken by the needle 216*e* from scattering into the space in the housing.

According to the magnetic disk device of Variation 2, other effects similar to those of the magnetic disk device 30 of the second embodiment described above are obtained.

Variation 3

Next, a magnetic disk device of Variation 3 of the second embodiment will be described with reference to FIGS. 13A to 13C. The magnetic disk device of Variation 3 has any of needles 216*a* to 216*c* having a shape different from that in the above-described second embodiment.

FIGS. 13A to 13C are schematic views illustrating some examples of the needles 216*a* to 216*c* of the magnetic disk device according to Variation 3 of the second embodiment. Note that, in the following drawings, the same reference signs are attached to the same configurations as those of the above-described second embodiment, and description thereof may be omitted.

In an example in FIG. 13A, the needle 216*a* has a plurality of recesses 217*a* at the upper end. The plurality of recesses 217*a* is partitioned from each other by, for example, ridges radially extending to the periphery with a central portion of the upper end as a vertex. Furthermore, the depths of these recesses 217*a* are adjusted such that the recesses 217*a* are recessed to positions below the sealing film 320 after penetration of the needle 216*a*. That is, after the needle 216*a* penetrates the sealing film 320, the bottom surfaces of these recesses 217*a* are located below the sealing film 320.

This enables an atmosphere in the housing to communicate with the space 310*r* in the case 310 also via the recesses 217*a* of the upper end of the needle 216*a* in addition to the gap of the sealing film 320 generated between the sealing film 320 and the needle 216*a*. Furthermore, even when the broken sealing film 320 is wound around the needle 216*a* to close the gap, a state of communication between the inside of the housing and the space 310*r* in the case 310 is secured via the recesses 217*a* at the upper end of the needle 216*a*.

In an example in FIG. 13B, the needle 216*b* has a plurality of grooves 217*b* radially extending from the pointed tip to the periphery and extending downward on a side wall of the needle 216*b*. The plurality of grooves 217*b* extends on the side wall of the needle 216*b* at least to positions below the sealing film 320 after penetration of the needle 216*b*.

This enables an atmosphere in the housing to communicate with the space 310*r* in the case 310 also via the grooves 217*b* of the side wall of the needle 216*b* in addition to the gap of the sealing film 320 generated between the sealing film 320 and the needle 216*b*. Furthermore, even when the broken sealing film 320 is wound around the needle 216*b* to close the gap, a state of communication between the inside of the housing and the space 310*r* in the case 310 is secured via the grooves 217*b* on the side wall of the needle 216*b*.

In an example in FIG. 13C, the needle 216*c* has a through hole 217*c* that penetrates the inside of the needle 216*c* in a direction of extension of the needle 216*c* from the pointed tip. Furthermore, the FPC plate has a groove 218*c* connected to the through hole 217*c* in the needle 216*c* at the lower end of the needle 216*c* and extending outward from the lower end of the needle 216*c*.

This enables an atmosphere in the housing to communicate with the space 310*r* in the case 310 also via the through hole 217*c* penetrating the inside of the needle 216*c* and the groove 218*c* on the upper surface of the FPC plate in addition to the gap of the sealing film 320 generated between the sealing film 320 and the needle 216*c*.

According to the magnetic disk device of Variation 3, the needle 216*a* has, at the upper end, the recesses 217*a* recessed to positions below the sealing film 320 which the needle 216*a* penetrates.

Alternatively, the needle 216*b* has grooves 217*b* extending in the vertical direction of the sealing film 320 which the needle 216*b* penetrates.

Still alternatively, the needle 216*c* has the through hole 217*c* penetrating the needle 216*c* in the direction of extension of the needle 216*c*. The FPC plate has, on the side wall, the groove 218*c* connected to the through hole 217*c* of the needle 216*c* and extending outward from the lower end of the needle 216*c*.

This causes a larger gap in the sealing film 320, which promotes hygroscopic reaction in the housing caused by the desiccant 340. Furthermore, the recesses 217*a* of the needle 216*a* or the groove 217*b* of the needle 216*b* causes the sealing film 320 to be more easily broken.

In addition, as in Variation 2 of the first embodiment described above, the needle 216*d* may be applied as a mechanism of opening the desiccant assembly 300 and the like of the second embodiment described above. The needle 216*d* includes the extending portion 219*ax* and the piercing portion 219*tp*. The extending portion 219*ax* extends through the sealing film 320. The piercing portion 219*tp* is provided at the upper end of the needle 216*d*, and has a cross-sectional area at least partially larger than the extending portion 219*ax*.

According to the magnetic disk device of Variation 3, other effects similar to those of the magnetic disk device 30 of the second embodiment described above are obtained.

Note that any of the needles 216*a* to 216*c* of Variation 3 described above can be applied as the mechanism of opening the desiccant assembly 100 of the first embodiment described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a housing in which a base and a cover are combined and airtightly closed;
a magnetic disk housed in the housing;
a needle protruding upward in an internal space of the housing; and
a desiccant assembly provided on the cover so as to face the base and be spaced away from the base by a predetermined distance,
wherein
the desiccant assembly includes:
a case including an opening on a surface facing the base,
a sealing film provided at the opening,
a division filter that divides space of the case into a first chamber and a second chamber, the second chamber including the opening, and
a desiccant filled in the first chamber, and
the second chamber communicates with the internal space of the housing by the needle penetrating the sealing film.

2. The magnetic disk device according to claim 1, wherein
the division filter extends in a direction intersecting an inner surface of the cover, and divides the space of the case in a direction along the inner surface of the cover, and
the first chamber and the second chamber are arranged side by side in the direction along the inner surface of the cover.

3. The magnetic disk device according to claim 1, wherein
the division filter extends in a direction along an inner surface of the cover, and divides the space of the case in a direction intersecting the inner surface of the cover, and
the first chamber is disposed between the second chamber and the cover.

4. The magnetic disk device according to claim 3, wherein
the cover includes a first vent penetrating the cover, and
the case includes a second vent connecting the first vent and the first chamber.

5. The magnetic disk device according to claim 4, wherein
the case includes a plurality of flow paths radially extending from a position immediately below the first vent, and
the second vent includes a plurality of second vents connected to ends of the plurality of flow paths.

6. The magnetic disk device according to claim 4, further comprising
a seal that airtightly closes the first vent.

7. The magnetic disk device according to claim 3, wherein the desiccant assembly further includes a shielding filter that surrounds an outer peripheral portion of a surface facing the base of the case and that shields space between the case and the base from the internal space of the housing.

8. The magnetic disk device according to claim 1, wherein the sealing film includes a thin portion processed to be thinner than another portion of the sealing film at a portion which the needle penetrates.

9. The magnetic disk device according to claim 1, wherein the needle is provided on an inner surface of the base.

10. The magnetic disk device according to claim 9, wherein the needle penetrates an FPC plate disposed on the base, and protrudes into the internal space of the housing.

11. The magnetic disk device according to claim 1, wherein the needle is provided on an FPC plate disposed on the base.

12. The magnetic disk device according to claim 11, wherein
an upper end of the needle is located in the second chamber,
the needle includes a through hole penetrating the needle in a direction of extension of the needle, and
the FPC plate includes a groove connected to the through hole of the needle and extending outward from a lower end of the needle.

13. The magnetic disk device according to claim 1, wherein
an upper end of the needle is located in the second chamber, and
the needle includes, at the upper end, a recess reached to a position below the sealing film which the needle penetrates.

14. The magnetic disk device according to claim 1, wherein
an upper end of the needle is located in the second chamber, and
the needle includes, at a side wall, a groove extending in upper and lower directions of the sealing film which the needle penetrates.

15. The magnetic disk device according to claim 1, wherein an upper end of the needle is located in the second chamber, and the needle includes:

an extending portion that extends through the sealing film, and a piercing portion provided at the upper end of the needle, at least partial portion of the piercing portion having a cross-sectional area larger than the extending portion.

16. The magnetic disk device according to claim 1, wherein the internal space of the housing is filled with gas having a density lower than that of air.

17. A method of manufacturing a magnetic disk device, comprising:

installing a magnetic disk in a base in which a needle protrudes;

attaching a desiccant assembly on a surface facing the base of a cover including a vent, the desiccant assembly including:

a case including an opening on a surface facing the base, a sealing film covering the opening, a division filter that divides space of the case into a first chamber and a second chamber, the second chamber including the opening, and a desiccant filled in the first chamber, causing the cover to which the desiccant assembly is attached to overlap the base on which the magnetic disk is installed and attaching the cover to the base; and injecting gas having a density lower than that of air into an internal space formed by the base and the cover through the vent of the cover and forming a housing in which the base and the cover are combined and air-tightly closed, wherein the attaching the cover to the base further includes:

communicating the second chamber with the internal space of the housing by causing the base and the cover to overlap each other, causing the needle protruding upward in the internal space between the base and the cover to abut on the sealing film, and removing at least a part of the sealing film from the opening with the needle, and disposing the desiccant assembly at a position away from the base by a predetermined distance and so as to face the base.

* * * * *